(12) United States Patent
Konishi

(10) Patent No.: US 6,229,960 B1
(45) Date of Patent: May 8, 2001

(54) CONTROL DEVICE FOR IMAGE BLUR CORRECTION

(75) Inventor: Kazuki Konishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/404,199

(22) Filed: Sep. 23, 1999

(30) Foreign Application Priority Data

Sep. 29, 1998 (JP) .................................... 10-290068
Jul. 2, 1999 (JP) .................................... 11-188585

(51) Int. Cl.[7] .................................... G03B 17/00
(52) U.S. Cl. .................................... 396/55; 396/89
(58) Field of Search .................................... 396/55, 52, 89

(56) References Cited

U.S. PATENT DOCUMENTS

| | | | |
|---|---|---|---|
| 5,210,563 | * 5/1993 | Hamada et al. | 396/55 |
| 5,966,549 | * 10/1999 | Hara et al. | 396/55 X |
| 6,009,279 | * 12/1999 | Kai et al. | 396/55 |
| 6,064,825 | * 5/2000 | Onuki | 396/55 |
| 6,067,419 | * 5/2000 | Shiomi | 396/555 |

FOREIGN PATENT DOCUMENTS 9-80512   3/1997  (JP) .

* cited by examiner

*Primary Examiner*—W. B. Perkey
(74) *Attorney, Agent, or Firm*—Fitzpatrick, Cella, Harper & Scinto

(57) ABSTRACT

A control device for image blur correction, which is applied to an image blur correction device, includes a calculation section and restriction section. The calculation section performs at least read-in operation of reading in outputs from vibration sensors, performs first calculation by using the outputs, and generates a driving control signal for driving the image blur correction device. The calculation section also performs second calculation different from the first calculation. The restriction section permits read-in operation of the output from the vibration sensors but restricts the first calculation when the calculation section performs the second calculation. With this arrangement, when the timing at which the calculation section performs the second calculation overlaps the timing at which the calculation section performs the first calculation, the first calculation is not performed, but the outputs from the vibration sensors is read in. An image blur correction apparatus, optical apparatus, and camera each including the image blur correction device are also disclosed.

20 Claims, 15 Drawing Sheets

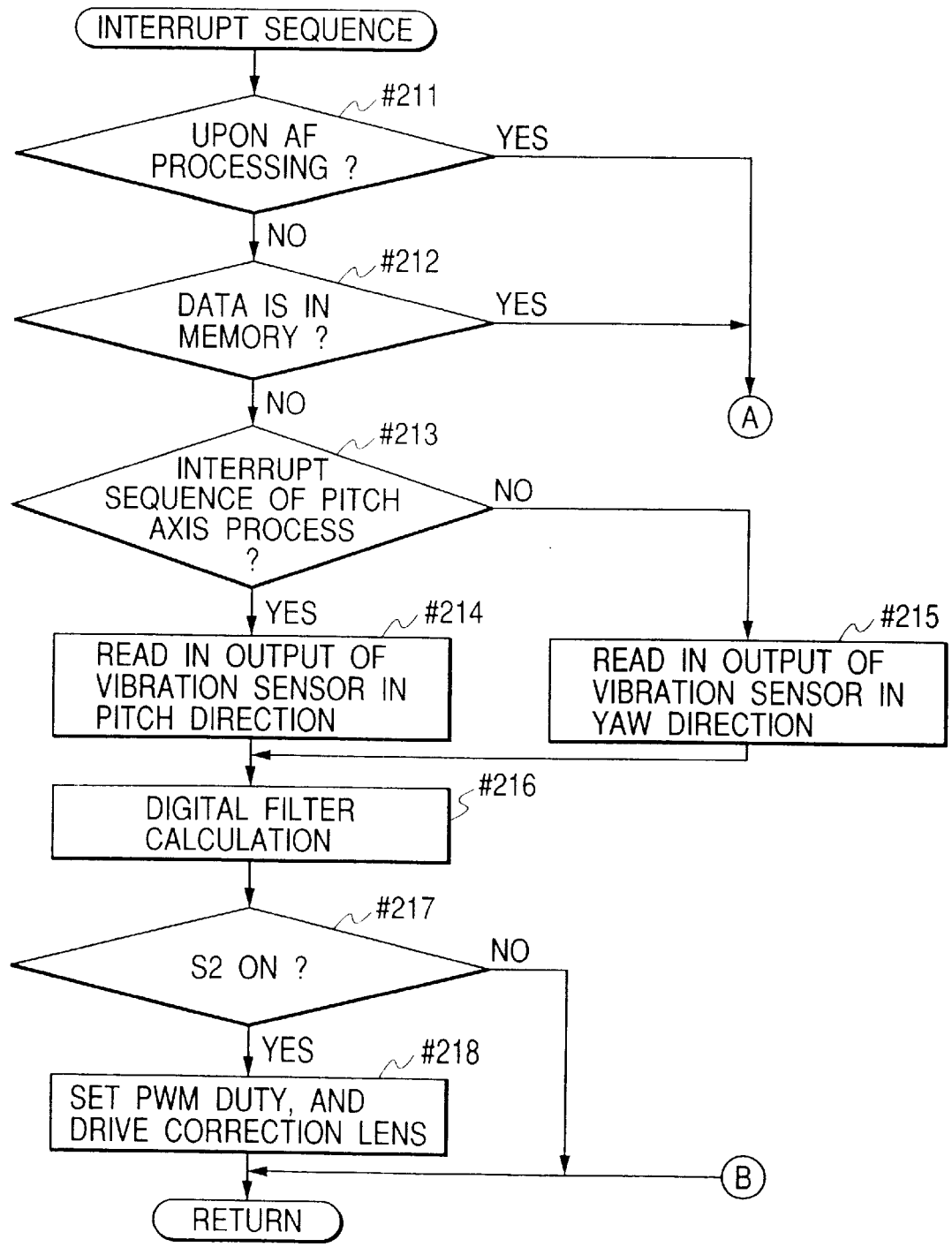

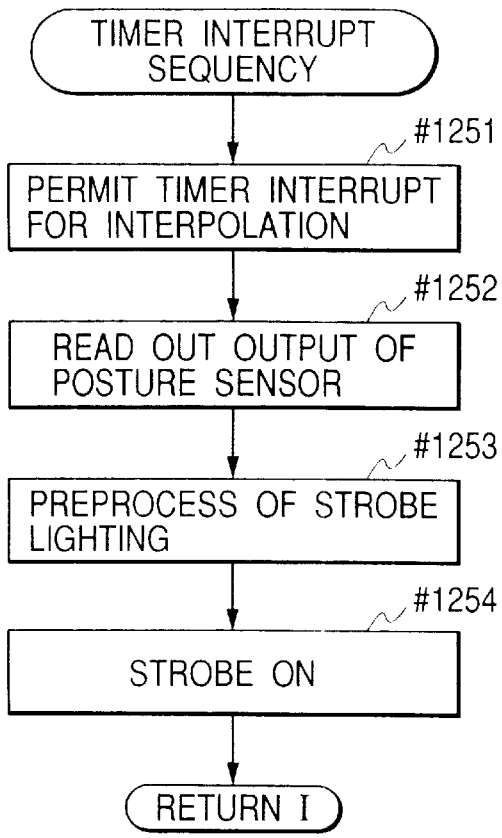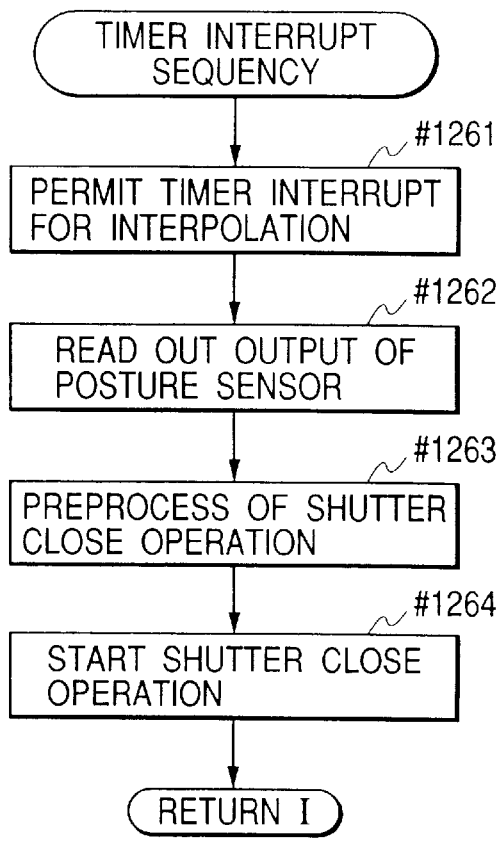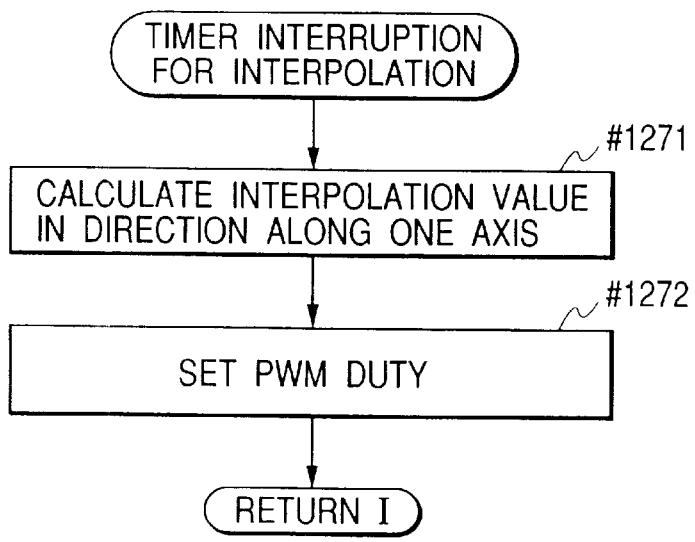

CONTROL DEVICE FOR IMAGE BLUR CORRECTION

BACKGROUND OF THE INVENTION

1. Field of the Invention

The present invention relates to a control device for image blur correction which is applied to an image blur correction device for correcting image blur produced in an optical device such as a camera.

2. Related Background Art

In a conventional camera that has an image blur correction function and is comprised of an MPU, distance measurement device, photometry device, strobe device, memory device, vibration sensor, correction lens, correction lens driving device, sensor for detecting the position of the correction lens, shutter, and shutter driving device, as disclosed by Japanese Patent Application Laid-Open No. 9-80512, blur correction control is performed by open control without using the position information of the correction lens during shutter control and strobe lighting operation so as to prevent noise, which is generated by an electrical noise produced by shutter control during blur correction control in exposure operation and strobe lighting, from being superimposed on the output from the correction lens position detection system, thus preventing the noise from affecting the blur correction precision.

As described above, according to Japanese Patent Application Laid-Open No. 9-80512, when processing as in shutter control and strobe lighting operation, other than vibration prevention processing, imposes a heavy load on the MPU, blur correction control is performed by open control without using any correction lens position information.

This technique alone cannot properly cope with AF calculation operation and the like during which heavier loads are imposed on the MPU. As a consequence, a calculation error is caused because the sampling intervals of input signals increase due to calculation delays. This makes hand vibration correction control insufficient, and may cause a deterioration in image quality instead of improving it.

SUMMARY OF THE INVENTION

According to one aspect of the invention, there is provided a control device for image blur correction, which is applied to an image blur correction device, comprising:

calculation means for performing at least a read-in operation of reading in an output from vibration detection means, performing first calculation by using the output, and generating a driving control signal for driving the image blur correction device, the calculation means also performing a second calculation different from the first calculation; and restriction means for permitting the read-in operation of the output from the vibration detection means but restricting the first calculation when the calculation means performs the second calculation. With this arrangement, when the timing at which the calculation means performs the second calculation overlaps the timing at which the calculation means performs the first calculation, the first calculation is not performed, but the output from the vibration detection means is read in.

BRIEF DESCRIPTION OF THE DRAWINGS

FIGS. 10A, 10B and 10C are flow charts showing another operation of the camera having the image blur correction function according to the fourth embodiment of the present invention;

DETAILED DESCRIPTION OF THE PREFERRED EMBODIMENTS

The present invention will be described in detail below on the basis of the illustrated embodiments.

Figure 1:
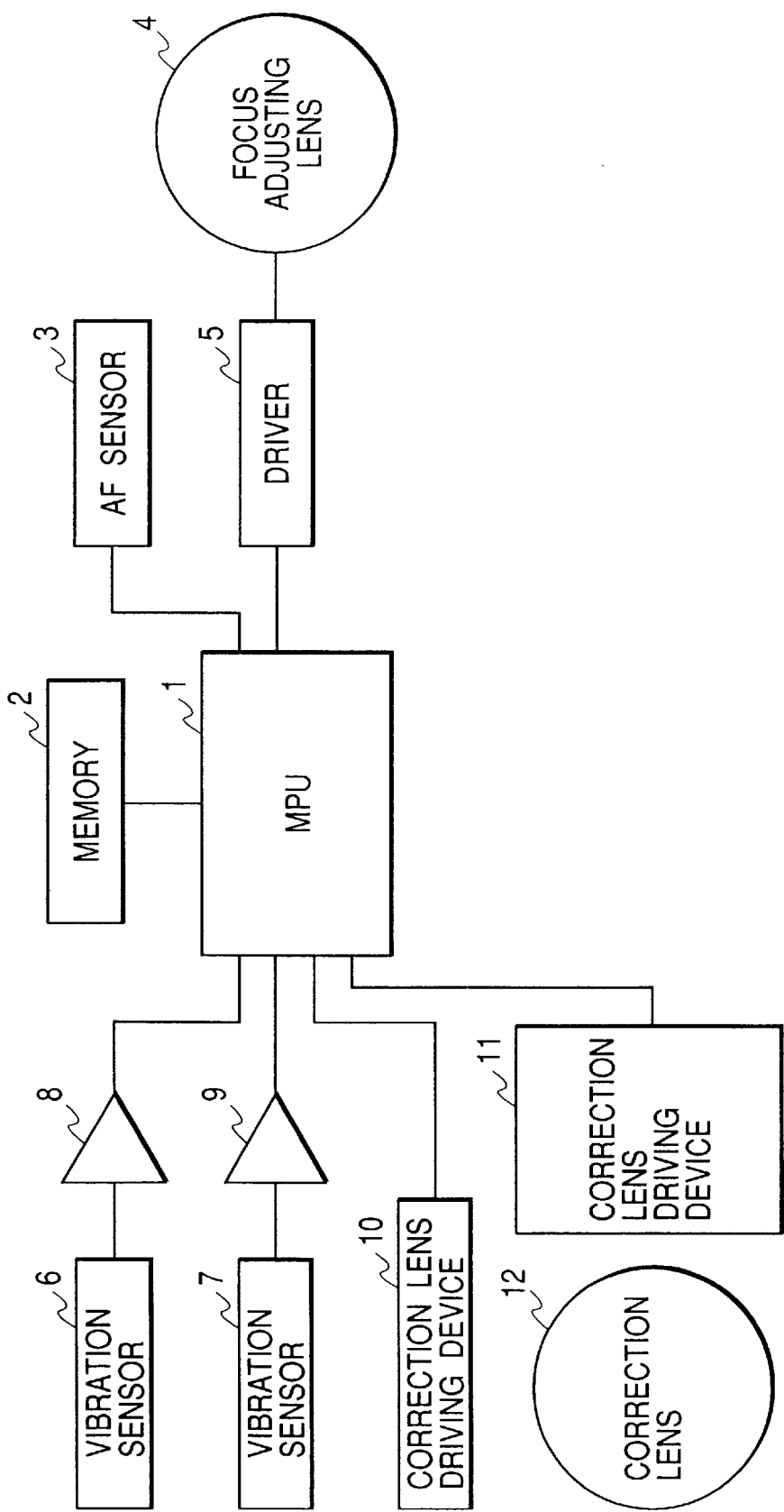
FIG. 1 is a block diagram showing the circuit arrangement of the main part of a camera according to the first embodiment of the present invention.

FIG. 1 is a block diagram showing the arrangement of the main part of a camera according to the first embodiment of the present invention. Referring to FIG. 1, the camera includes an MPU (microprocessing unit) 1, a memory 2, an AF sensor 3 made up of a skim CCD and the like, a focus adjusting lens (AF lens) 4, a driver 5 for driving the focus adjusting lens 4, a vibration sensor 6, such as a vibration gyro for detecting vibrations in the pitch direction, a vibration sensor 7, such as a vibration gyro for detecting vibrations in the yaw direction, amplifiers 8 and 9 for amplifying the outputs from the vibration sensors 6 and 7, a correction lens driving device 10 for driving a correction lens 12 in the pitch direction, a correction lens driving device 11 for driving the correction lens 12 in the yaw direction, and the correction lens 12 for correcting hand vibrations.

Referring to FIG. 1, the outputs of the vibration sensors 6 and 7 are connected to the A/D conversion input terminals of the MPU 1 through the amplifiers 8 and 9. The angular velocities of the hand vibrations detected by the vibration sensors 6 and 7 are integrated to obtain a position signal, and control is performed by using the value of the position signal. That is, the hand vibrations are corrected by driving the correction lens 12 in a direction to correct the hand vibrations by an amount corresponding to the hand vibration amount.

In AF processing, the MPU 1 reads out a signal from the AF sensor 3 and processes it to move the focus adjusting lens 4 to a desired position in accordance with the value obtained by -the calculation processing.

This hand vibration sequence will be described with reference to the flow charts of FIGS. 2A and 2B.

Figure 2A:
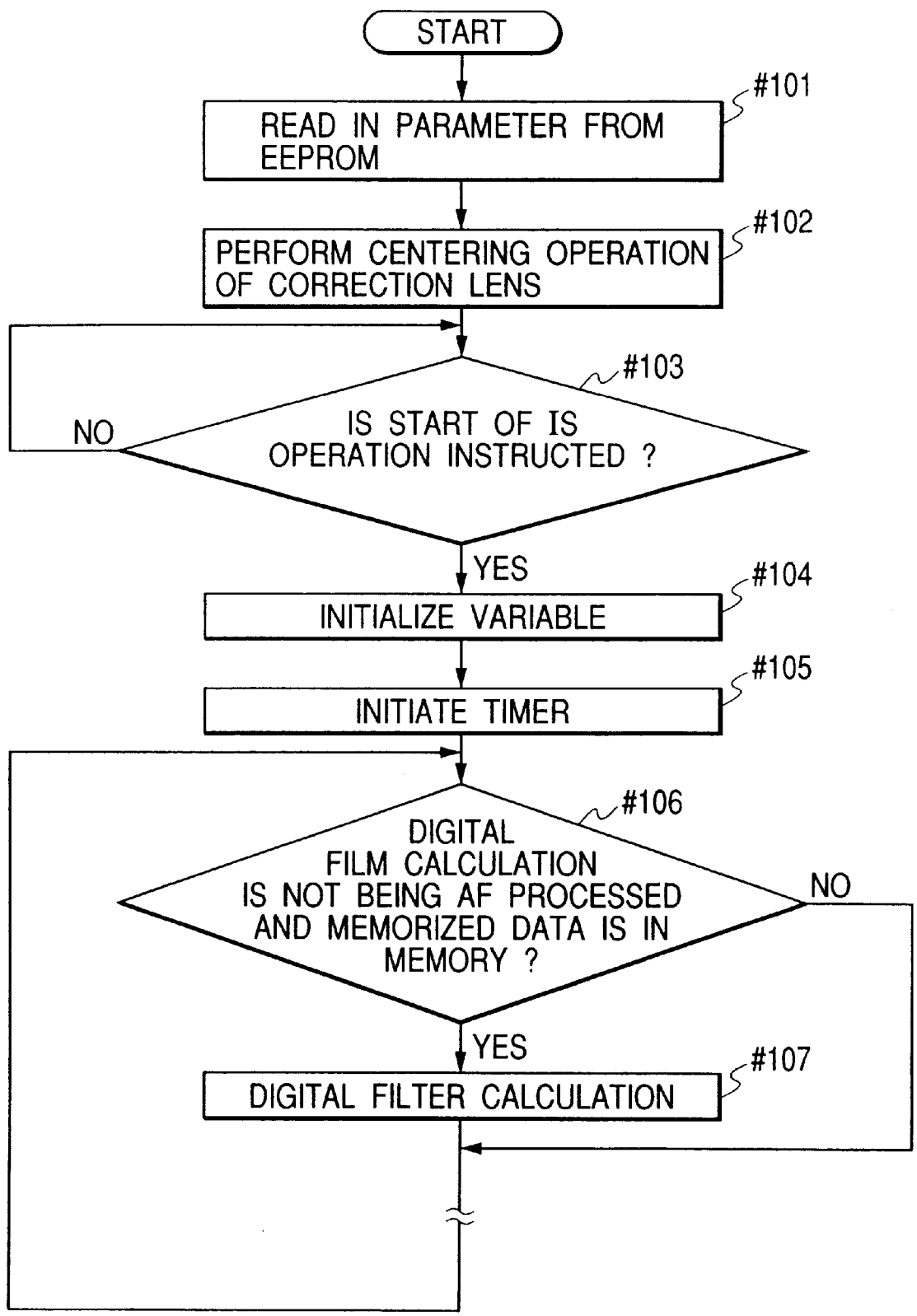
FIGS. 2A and 2B are flow charts showing the operation of the main part of the camera according to the first embodiment of the present invention.

When the main sequence is started by, for example, turning on the main switch of the camera, the MPU 1 reads in various parameters from an EEPROM (not shown) in a series of operations in initialization processing and stores the parameters at predetermined addresses in the memory 2 in step #101 in FIG. 2A. In step #102, the MPU 1 performs centering operation of the correction lens 12.

In step #103, the MPU 1 checks whether a photographer has instructed the start of a series of operations of a vibration prevention (IS) system by, for example, turning on a switch SW1 (not shown) which is turned on by the first stroke operation of the shutter button. If the start of vibration prevention is instructed (note that blur correction has not been performed yet), the flow advances to step #104 to, for example, initialize the variables to be used in the following processing. In step #105, the MPU 1 initiates a timer for obtaining a sampling timing. This timer generates interrupts at predetermined intervals. The intervals are determined in accordance with the hand vibration prevention ability and are generally set to about 500 μsec to 1 msec.

In step #107, the MPU 1 performs processing by using the data memorized during AF processing and the like.

As will be described later, the MPU 1 starts digital filter calculation using the data memorized in the AF processing when the AF processing request is canceled. Before the AF processing request is generated, therefore, the MPU 1 sets a loop including step #106 to wait for the generation of an interrupt. The digital film calculation in step #107 is executed while no AF processing is being performed and the data memorized during AF processing and the like are present in the memory 2.

Figure 2B:
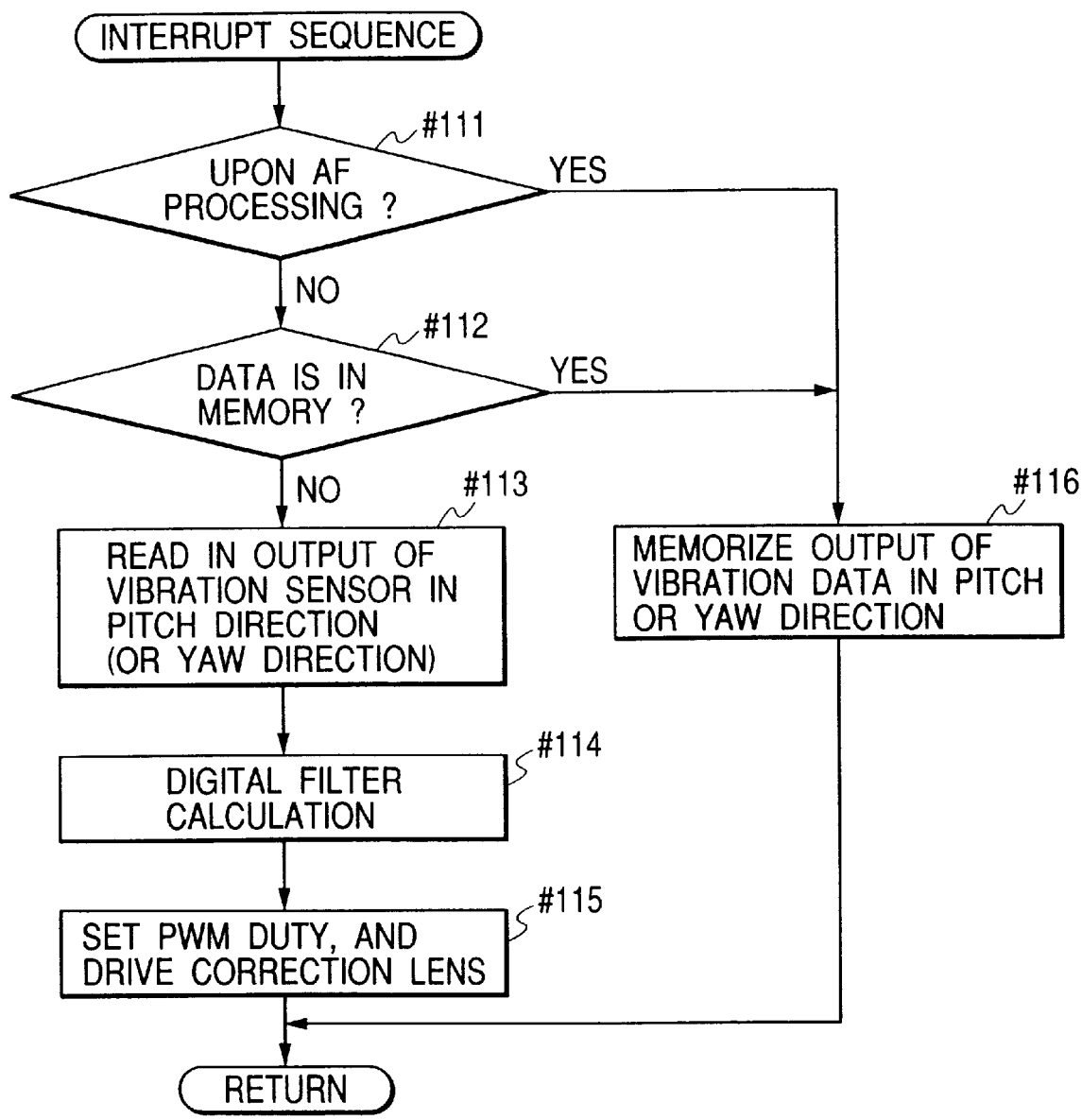

The MPU 1 executes the sequence shown in FIG. 2B every time the timer generates an interrupt.

In the interrupt sequence in FIG. 2B, first of all, the MPU 1 checks in step #111 whether AF processing is being performed. If YES in step #111, the flow advances to step #116. In step #112, the MPU 1 checks whether any data used for digital calculation is in the memory 2. Digital filter calculation using this data is performed in step #107. The presence of data in the memory 2 indicates that the digital filter calculation using the data memorized during AF processing has not completed. In this case, driving of the correction lens 12 may cause an image deterioration. For this reason, the correction lens 12 is not driven. If, therefore, any data is in the memory 2, the flow advances form step #112 to step #116.

If no AF processing is being performed (N in step #111 (N means NO and Y means YES)) and there is no data stored during AF processing and the like in the memory 2 (N in step #112), the flow advances to step #113 to execute the following processing.

First of all, the MPU 1 alternately reads in the outputs from the vibration sensors 6 and 7, which detect vibrations in the pitch and yaw directions, through the A/D conversion input terminals. More specifically, in step #113, at first, the MPU 1 reads in the output from the vibration sensor 6, which detects vibrations in the pitch direction, through the amplifier 8 and the A/D conversion input terminal. This hand vibration signal exhibits the median value in the A/D conversion input range when the angular velocity of a hand vibration is zero; an output larger than the median value when the angular velocity of a hand vibration is positive; and an output smaller than the median value when the angular velocity of a hand vibration is negative. The MPU 1 therefore subtracts a median value Vo in the A/D conversion input range from each output value Vin read in from the A/D conversion input terminal to obtain a value Vp, and controls the correction lens 12 by using the value obtained by integrating the values Vp.

In step #114, the MPU 1 performs digital filtering by using the value Vp. In this case, the MPU 1 concurrently performs integration and high-pass filtering before the integration. High-pass filtering is performed to prevent slight offset components superimposed on the value Vp from being integrated so as to prevent the integrated value from overflowing. The design of the digital filter to be used changes depending on the hand vibration correction precision required and the like based on the frequency band of hand vibrations to be corrected and the performance of the camera. In this case, two pairs of high-pass filters and integrators respectively having poles of 1 Hz and 0.2 Hz are designed. During control, these pairs are switched from the one having a pole of 1 Hz to the one having a pole of 0.2 Hz. This can eliminate any phase error during control and stabilize the filter output at an early stage. This switching of frequencies as poles is referred to as time constant switching. In practice, the MPU 1 sequentially obtains outputs according to the following equation:

$$Yp_n = a1 \times (Xp_{n-2} - Xp_n) + a2 \times Yp_n - 1 + a3 \times Yp_{n-2}$$

Parameters a1, a2, and a3 in the above equation are changed in time constant switching. This switching operation is performed about one sec after the start of integration. The value $Xp_n$ is a filter input value at an nth sampling point n in the pitch direction, i.e., the value Vp.

The values $Xp_n$ and $Yp_n$ are filter output values at the nth sampling point n in the pitch direction. The values $Xp_{n-1}$ and $Yp_{n-1}$ are filter input and output values at an (n−1)th sampling point n−1 in the pitch direction. The values $X_{n-2}$ and $Y_{n-2}$ are filter input and output values at an (n−2)th sampling point n−2 in the pitch direction. These input values can be obtained by properly converting the value Vp. Assume that the values $Xp_{n-2}$, $Yp_{n-1}$, and $Yp_{n-2}$ are zero at the first sampling (n=0). Likewise, the values $Xp_{n-2}$ and $Yp_{n-2}$ are zero at the second sampling (n=1).

In step #115, the MPU 1 obtains the driving position of the correction lens 12 from the value $Yp_n$. This embodiment uses a driving device using a moving magnet (MM) to move the correction lens 12 to a position proportional to the current supplied to the coil.

The MPU 1 obtains the current value to be supplied to the coil from the value $Yp_n$. In this case, the current to be supplied to the coil is not supplied as an analog quantity but as a digital quantity having undergone PWM (Pulse Width Modulation). This is because, for example, it is advantageous in terms of cost to control a current as a digital quantity by using the MPU 1. For this reason, a table for obtaining a PWM duty from the value $Yp_n$ is prepared, and the MPU 1 obtains the address in the memory at which the corresponding PWM duty is stored from the value $Yp_n$ and reads in the corresponding value, thereby setting a PWM duty. Note that this table is preferably set in the EEPROM.

When a PWM cycle and PWM duty is obtained in this manner, the MPU 1 sets this value in a predetermined register. With this operation, a PWM driving signal is supplied to the correction lens driving device 10. Upon reception of the driving signal, the correction lens driving device 10 supplies a current proportional to the supplied signal to the coil to drive the correction lens 12 to a predetermined position in the pitch direction (vertical direction). That is, the correction lens 12 is held at the predetermined position in accordance with the supplied driving signal until the next driving signal is supplied.

When the timer generates an interrupt next, the MPU 1 checks whether AF processing is being performed and data is in the memory 2. If no AF processing is being performed and no data is in the memory 2, the flow advances to step #113. In step #113, the MPU 1 reads in the output from the vibration sensor 7, which detects vibrations in the yaw direction, through the amplifier 9 and the A/D conversion input terminal. The MPU 1 obtains a value Vy by subtracting the median value Vo in the A/D conversion input range from the output value Vin read in through the A/D conversion input terminal, and controls the correction lens 12 by using the value Vy. In step #114, the MPU 1 performs digital filtering by using the value Vy. In this case, the MPU 1 concurrently performs integration and high-pass filtering before the integration. At this time, two pairs of high-pass filters and integrators respectively having poles of 1 Hz and 0.2 Hz are designed. During control, these pairs are switched from the one having a pole of 1 Hz to the one having a pole of 0.2 Hz. In practice, the MPU 1 sequentially obtains outputs according to the following equation:

$$Yy_n = a1 \times (Xy_{n-2} - 2 - Xy_n) + a2 \times Yy_{n-1} + a3 \times Yy_{n-2}$$

The parameters a1, a2, and a3 in the above equation are changed in time constant switching. This switching operation is performed about one sec after the start of integration. The value $Xy_n$ is a filter input value at the nth sampling point n in the yaw direction, i.e., the value Vy. The value $Yy_n$ is a filter output value at the nth sampling point n in the yaw direction. The values $Xy_{n-1}$ and $Yy_{n-1}$ are filter input and output values at the (n−1)th sampling point n−1 in the yaw direction. The values $Xy_{n-2}$ and $Yy_{n-2}$ are filter input and output values at the (n−2)th sampling point n−2 in the yaw direction. Assume that the values $Xy_{n-2}$, $Yy_{n-1}$, a $Yy_{n-2}$ are zero at the first sampling (n=0). Likewise, the values $Xy_{n-2}$ and $Yy_{n-2}$ are zero at the second sampling (n=1).

In step #115, the MPU 1 obtains the driving position of the correction lens 12 from the value $Yy_n$. As described above, this embodiment uses the driving device using the moving magnet (MM) to move the correction lens 12 to a position proportional to the current supplied to the coil. The MPU 1 obtains the current value to be supplied to the coil from the value $Yy_n$. In this case, the current to be supplied to the coil is not supplied as an analog quantity but as a digital quantity having undergone PWM (Pulse Width Modulation). For this reason, a table for obtaining a PWM duty from the value $Yy_n$ is prepared, and the MPU 1 obtains the address in the memory at which the corresponding PWM duty is stored from the value Yy, and reads in the corresponding value, thereby setting a PWM duty.

When a PWM cycle and PWM duty is determined in this manner, the MPU 1 sets this value in a predetermined register. With this operation, a PWM driving signal is supplied to the correction lens driving device 11. Upon reception of the driving signal, the correction lens driving device 11 supplies a current proportional to the supplied signal to the coil to drive the correction lens 12 to a predetermined position in the yaw direction (horizontal direction). That is, the correction lens 12 is held at the predetermined position in accordance with the supplied driving signal until the next driving signal is supplied.

When driving of the correction lens 12 is started in this manner, vibration prevention processing for stabilizing the driving of the correction lens 12 is performed for a predetermined period of time. More specifically, as described above, the MPU 1 alternately reads in the outputs from the vibration sensors 6 and 7 in the pitch and yaw directions through the A/D conversion input terminals every time the timer generates an interrupt. The MPU 1 then performs digital filter calculation and obtains the current (PWM duty) to be supplied to the coil from the calculation result so as to set the desired driving position of the correction lens 12. The MPU 1 drives the correction lens 12 by setting this value in a predetermined register.

While an AF calculation processing request is kept output during this processing, when the timer generates an interrupt to obtain the timing of the above sampling, the MPU 1 only reads in the outputs from the vibration sensors 6 and 7 through the A/D conversion input terminals and store them in the memory 2 without performing the above digital filtering (step #111→step #116 in FIG. 2B).

The time required for this processing is equal to or less than 0.01% of the total processing time, and hence has no adverse effect on AF calculation processing. If, however, digital filtering has already been started, the interrupt-ion of the processing is started at the next interrupt timing.

During this interruption, the driving of the correction lens 12 is also interrupted (without passing through the step #113 to step #115). Assume that the driving of the correction lens 12 is resumed at the sampling timing at which digital filtering operation using the data stored in the memory 2 is complete, and digital filtering operation using the input values through the A/D conversion input terminals is started. That is, the driving of the correction lens 12 is resumed when all blank intervals with no digital filter output are filled by calculation using memorized data to ensure the real time property of the digital filter outputs. This is because, digital filter output values during interruption of digital filter calculation or immediately after resumption differ from those when digital filter calculation is continued without being interrupted.

If the AF calculation processing request is canceled, the MPU 1 performs digital filter calculation using the values stored in the memory 2 (step #106→step #107 in FIG. 2A).

If the timer generates an interrupt during this processing (processing in step #107) to obtain the timing of the above sampling operation, since the data to be processed in step #107 is in the memory 2, the flow advances from step #112 to step #116 to read in the outputs from the vibration sensors 6 and 7 through the A/D conversion input terminals and store the read values in the memory 2. In this case, the memory 2 does not perform digital filtering by using the values read in through the A/D conversion input terminals.

In this case, since the time required for digital filter calculation is sufficiently short as compared with the sampling timing of the outputs from the vibration sensors 6 and 7, the cycle of digital filter calculation using the values stored in the memory 2 is much shorter than the memorization cycle of the outputs from the vibration sensors 6 and 7 which are read in through the A/D conversion input terminals. This processing therefore is completed at a relatively early stage. If no value is stored in the memory 2, digital filter calculation using the values stored in the memory 2 is completed, and the normal processing is restored. That is, when the timer generates an interrupt to obtain the timing of the above sampling operation, the memory 2 reads in the outputs from the vibration sensors 6 and 7 through the A/D conversion input terminals, and performs the above digital filtering using the read values.

As described above, the driving of the correction lens 12 is resumed at this stage.

As described above, when the load of processing other than vibration prevention control is heavy in the MPU 1 which performs AF calculation processing, digital filtering of a hand vibration signal is interrupted. During this interruption, the MPU 1 reads in the outputs from the vibration sensors 6 and 7, and terminates the AF calculation processing. If the load on the MPU 1 decreases, the MPU 1 resumes vibration prevention calculation. After the resumption of this calculation, the MPU 1 performs calculation processing of the hand vibration signal by using the data read in during the interruption, thereby preventing a deterioration in image quality due to insufficient hand vibration correction control.

(Second Embodiment)

Figure 3:
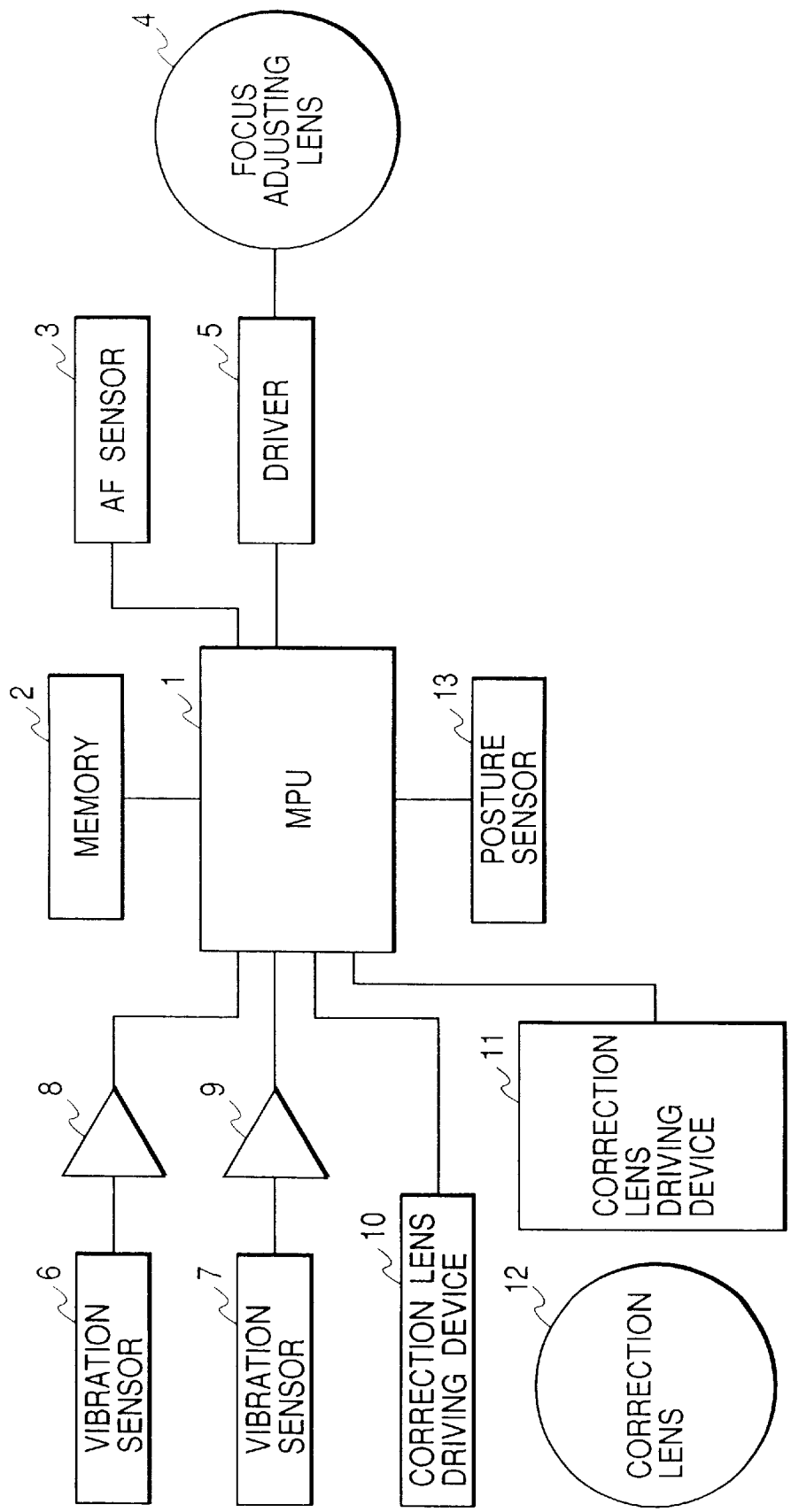
FIG. 3 is a block diagram showing the circuit arrangement of the main part of a camera according to the second embodiment of the present invention.

FIG. 3 is a block diagram showing the arrangement of the main part of a camera according to the second embodiment of the present invention. This camera differs from the one shown in FIG. 1 only in that a posture sensor 13 for detecting the posture of the camera is added.

In the second embodiment, a position signal is obtained by integrating the angular velocities of the hand vibrations of the camera which are detected by vibration sensors 6 and 7, and control is performed by using the obtained value. That is, hand vibrations are corrected by driving a correction lens 12 in a direction to correct the hand vibrations by an amount corresponding to the hand vibration amount. The outputs from the vibration sensors 6 and 7 may be integrated before A/D conversion by an integration circuit provided outside an MPU 1. In this embodiment, however, integration is performed after A/D conversion by the MPU 1 using a so-called digital filter.

In this embodiment, when the load of processing such as AF calculation processing other than vibration prevention processing is heavy in the MPU 1, digital filter calculation in one axial direction (pitch or yaw direction) is interrupted, and an axial direction in which only processing of storing the output values from the vibration sensors 6 and 7 is performed is determined on the basis of the output from the posture sensor 13.

Figure 4:
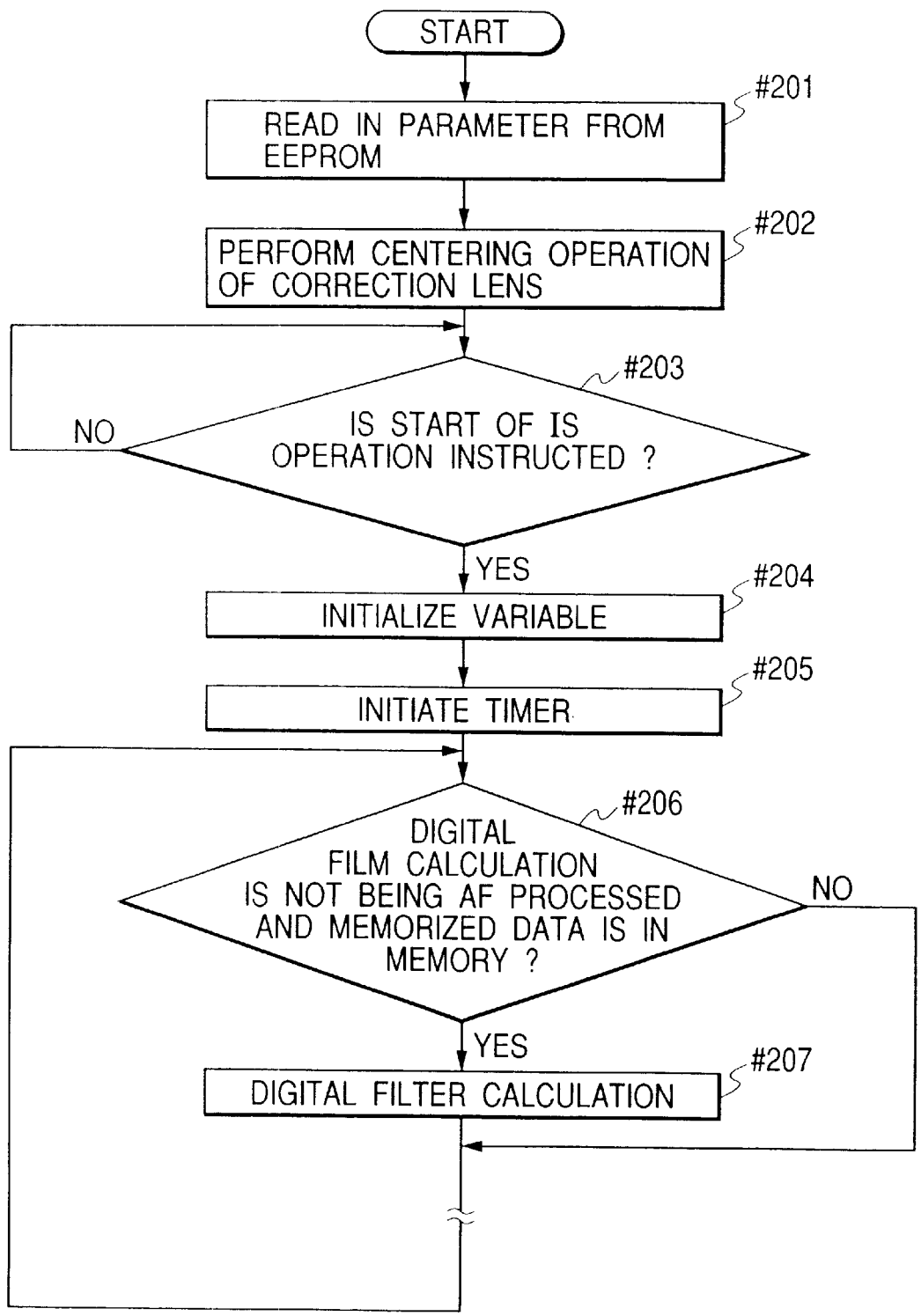
FIG. 4 is a flow chart showing the operation of the main part of the camera according to the second embodiment of the present invention.
Figure 5B:
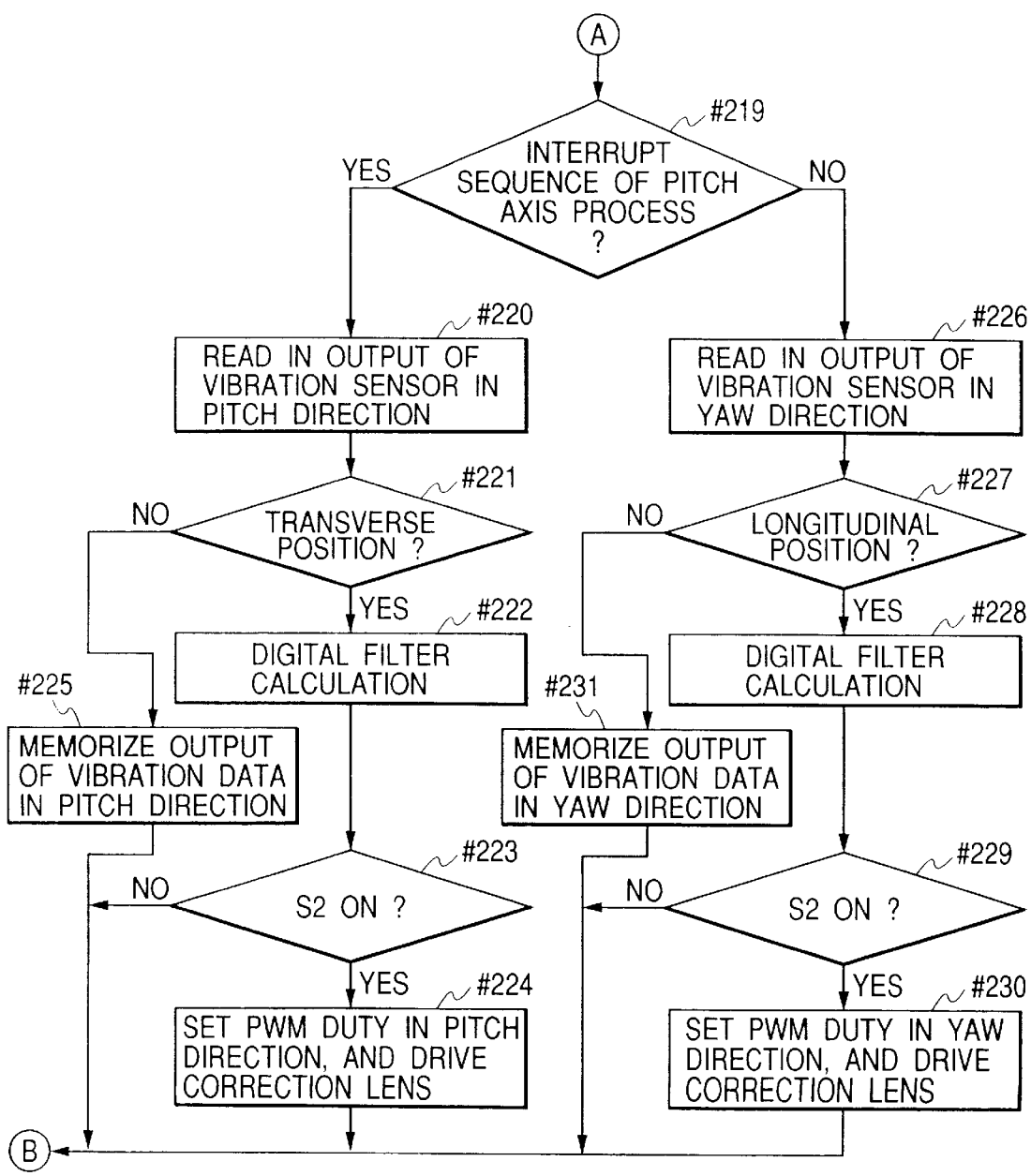
FIG. 5, which is comprised of FIGS. 5A and 5B, illustrates flow charts showing the operation of the main part of the camera according to the second embodiment of the present invention.

This hand vibration correction sequence will be described with reference to the flow charts of FIGS. 4 and 5A and 5B.

When the main sequence is started by, for example, turning on the main switch of the camera, the MPU 1 reads in various parameters from an EEPROM (not shown) in a series of operations in initialization processing and stores the parameters at predetermined addresses in a memory 2 in step #201. In step #202, the MPU 1 performs centering operation of the correction lens 12. In step #203, if the MPU 1 determines that a photographer has instructed the start of a series of operations of a vibration prevention (IS) system by, for example, turning on a switch SW1 (not shown) which is turned on by the first stroke operation of the shutter button, the flow advances to step #204 to initialize the variables to be used in the following processing.

In step #205, the MPU 1 initiates a timer for obtaining a sampling timing. This timer generates interrupts at predetermined intervals. The intervals are determined in accordance with the hand vibration prevention ability and are generally set to about 500 μsec to 1 msec.

In step #207, the MPU 1 performs processing by using the data stored during AF processing and the like.

As will be described later, the MPU 1 starts digital filter calculation using the data stored in the AF processing when the AF processing request is canceled. Before the AF processing request is generated, therefore, the MPU 1 sets a loop including step #206 to wait for the generation of an interrupt. The digital film calculation in step #207 is executed while no AF processing is being performed and the data stored during AF processing and the like are present in the memory 2.

If no AF processing is being performed and no data is in the memory 2, the MPU 1 alternately reads in the outputs from the vibration sensors 6 and 7, which detect vibrations in the pitch and yaw directions, through the A/D conversion input terminals every time the timer generates an interrupt. First of all, the MPU 1 reads in the output from the vibration sensor 6, which detects vibrations in the pitch direction, through an amplifier 8 and the A/D conversion input terminal (step #214). This hand vibration signal exhibits the median value in the A/D conversion input range when the angular velocity of a hand vibration is zero; an output larger than the median value when the angular velocity of a hand vibration is positive; and an output smaller than the median value when the angular velocity of a hand vibration is negative. The MPU 1 therefore subtracts a median value Vo in the A/D conversion input range from each output value Vin read in from the A/D conversion input terminal to obtain a value Vp, and controls the correction lens 12 by using the value obtained by integrating the values Vp.

The MPU 1 then performs digital filtering by using the value Vp (step #216). In this case, the MPU 1 concurrently performs integration and high-pass filtering before the integration. High-pass filtering is performed to prevent slight offset components superimposed on the value Vp from being integrated so as to prevent the integrated value from overflowing. The design of the digital filter to be used changes depending on the hand vibration correction precision required and the like based on the frequency band of hand vibrations to be corrected and the performance of the camera. In this case, four pairs of high-pass filters and integrators respectively having poles of 10 Hz, 2 Hz, 1 Hz, and 0.1 Hz are designed. During control, these pairs are sequentially switched from the one having a pole of 10 Hz to the one having a pole of 0.1 Hz. This can eliminate any phase error during control and stabilize the filter output at an early stage. This switching of frequencies as poles is termed as time constant switching. In practice, the MPU 1 sequentially obtains outputs according to the following equation:

$$Yp_n = a1 \times (Xp_{n-2} - Xp_n) + a2 \times Yp_{n-1} + a3 \times Yp_{n-2}$$

Parameters a1, a2, and a3 in the above equation are changed in time constant switching. These values are sequentially switched for about one sec after the start of integration. For example, a pole frequency of 10 Hz is switched to 2 Hz 0.1 sec after the start of integration, to 1 Hz 0.3 sec after the start of integration, and to 0.1 Hz 1 sec after the start of integration. The value $Xp_n$ is a filter input value at an nth sampling point n in the pitch direction, i.e., the value Vp. The values $Xp_n$ and $Yp_n$ are filter output values at the nth sampling point n in the pitch direction. The values $Xp_{n-1}$ and $Yp_{n-1}$ are filter input and output values at an (n−1)th sampling point n−1 in the pitch direction. The values $X_{n-2}$ and $Y_{n-2}$ are filter input and output values at an (n−2)th sampling point n−2 in the pitch direction. Assume that the values $Xp_{n-2}$, $Yp_{n-1}$, and $Yp_{n-2}$ are zero at the first sampling (n=0). Likewise, the values $Xp_{n-2}$ and $Yp_{n-2}$ are zero at the second sampling (n=1). Although this embodiment uses a high-pass filter and a filter integrally formed by an integrator, these two filters may be separately calculated.

Upon generation of the next interrupt from the timer, if no AF processing is being performed and no data is in the memory 2, the MPU 1 reads in the output from the vibration sensor 7, which detects vibrations in the yaw direction, through an amplifier 9 and the A/D conversion input terminal (step #215). In this case, the MPU 1 obtains a value Vy by subtracting a median value Vo in the A/D conversion input range from an output value Vin read in through the A/D conversion input terminal, and controls the correction lens 12 by using this value Vy.

The MPU 1 then performs digital filtering by using the value Vy (step #217). In this case, the MPU 1 concurrently performs integration and high-pass filtering before the integration. In this case, four pairs of high-pass filters and integrators respectively having poles of 10 Hz, 2 Hz, 1 Hz, and 0.1 Hz are designed. During control, these pairs are sequentially switched from the one having a pole of 10 Hz to the one having a pole of 0.1 Hz. In practice, the MPU 1 sequentially obtains outputs according to the following equation:

$$Yy_n = a1 \times (Xy_{n-2} - Xy_n) + a2 \times Yy_{n-1} + a3 \times Yy_{n-2}$$

The parameters a1, a2, and a3 in the above equation are changed in time constant switching. These values are sequentially switched for about one sec after the start of integration. For example, a pole frequency of 10 Hz is switched to 2 Hz 0.1 sec after the start of integration, to 1 Hz 0.3 sec after the start of integration, and to 0.1 Hz 1 sec after the start of integration. The value $Xy_n$ is a filter input value at the nth sampling point n in the yaw direction, i.e., the value Vy. The value $Yy_n$ is a filter output value at the nth sampling point n in the yaw direction. The values $Xy_{n-1}$ and $Yy_{n-1}$ are filter input and output values at the (n−1)th sampling point n−1 in the yaw direction. The values $Xy_{n-2}$ and $Yy_{n-2}$ are filter input and output values at the (n−2)th sampling point n−2 in the yaw direction. Assume that the values $Xy_{n-2}$, $Yy_{n-1}$, and $Yy_{n-2}$ are zero at the first sampling (n=0). Likewise, the values $Xy_{n-2}$ and $Yy_{n-2}$ are zero at the second sampling (n=1).

While the AF calculation processing request is kept output during this processing (Y (YES) in step #211), when the timer generates an interrupt to obtain the timing of the above sampling operation, the MPU 1 performs only the processing of reading in the output from the vibration sensor through the A/D conversion input terminal and storing it in the memory 2 (step #220→step #221→step #225→step #226→step #227→step #231) without performing the above digital filtering along one of the pitch and yaw axes. Along the other axis, when the timer generates an interrupt to obtain the timing of the above sampling operation, the MPU 1 performs the above digital filtering (step #222 or #228). This shortens the time required for vibration prevention processing to about ½, and hence ensures a sufficient time for AF calculation processing.

Whether to interrupt digital filtering along the pitch or yaw axis is determined on the basis of the output from the posture sensor 13. If it is known from the output from the posture sensor 13 that the camera is at a so-called transverse position (Y in step #221), the memory 2 interrupts digital filter calculation in the yaw-axis direction, and continues digital filter calculation in the pitch-axis direction (step #222). In contrast to this, if it is known from the output from the posture sensor 13 that the camera is at a so-called longitudinal position (Y in step #227), the MPU 1 interrupts digital filter calculation in the pitch-axis direction, and continues digital filter calculation in the yaw-axis direction (step #228). If, however, the MPU 1 has already started digital filtering, the MPU 1 starts interrupting the processing at the next interrupt timing.

If the AF calculation processing request is canceled, since the data stored during the AF processing is in the memory 2 (N step #206), the MPU 1 performs digital filter calculation by using the values stored in the memory 2 (step #207). When the timer generates an interrupt to obtain the timing of the above sampling operation, since the data stored during AF processing and the like is stored in the memory 2 (step #212→step #218), the MPU 1 reads in the output from the vibration sensor 6 or 7 through the A/D conversion input terminal and stores it in the memory 2. The MPU 1 does not perform digital filtering using the value read in through the A/D conversion input terminal. That is, the MPU 1 performs digital filter calculation using the stored values while storing the output from the vibration sensor 6 or 7 in the memory 2.

In this case, since the time required for digital filter calculation is sufficiently short as compared with the sampling timing of the outputs from the vibration sensors 6 and 7, the cycle of digital filter calculation using the values stored in the memory 2 is much shorter than the memorization cycle of the outputs from the vibration sensors 6 and 7 which are read in through the A/D conversion input terminals. This processing therefore is completed at a relatively early stage. If no value is stored in the memory 2, digital filter calculation using the values stored in the memory 2 is completed, and the normal processing is restored. That is, when the timer generates an interrupt to obtain the timing of the above sampling operation, the memory 2 reads in the outputs from the vibration sensors 6 and 7 through the A/D conversion input terminals, and performs the above digital filtering using the read values.

If the shutter button is pressed to the second stroke to turn on a switch SW2 (not shown) during this digital filtering (Y in step #217, Y in step #223, and Y in step #229), the MPU 1 drives the correction lens 12 on the basis of the output from the digital filter (steps #218, #224, and #230). More specifically, first of all, the MPU 1 obtains the driving position of the correction lens 12 from the value $Yp_n$. This embodiment uses a driving device using a moving magnet (MM) to move the correction lens 12 to a position proportional to the current supplied to the coil. The MPU 1 obtains the current value to be supplied to the coil from the value $Yp_n$ (or $Yy_n$). In this case, the current to be supplied to the coil is not supplied as an analog quantity but as a digital quantity having undergone PWM (Pulse Width Modulation). This is because, for example, it is advantageous in terms of cost to control a current as a digital quantity by using the MPU 1. For this reason, a table for obtaining a PWM duty from the value $Yp_n$ (or $Yy_n$) is prepared, and the MPU 1 obtains the address in the memory at which the corresponding PWM duty is stored from the value $Yp_n$ (or $Yy_n$) and reads in the corresponding value, thereby setting a PWM duty. Note that this table is preferably set in the EEPROM.

When a PWM cycle and PWM duty is obtained in this manner, the MPU 1 sets this value in a predetermined register. With this operation, a PWM driving signal is supplied to a correction lens driving device 10 (or correction lens driving device 11). Upon reception of the driving signal, the correction lens driving device 10 (or correction lens driving device 11) supplies a current proportional to the supplied signal to the coil to drive the correction lens 12 to a predetermined position in the pitch direction (vertical direction) (or in the yaw direction (horizontal direction)).

That is, the correction lens 12 is held at the predetermined position in accordance with the supplied driving signal until the next driving signal is supplied.

In this manner, the correction lens 12 is driven. As described above, every time the timer generates an interrupt, the MPU 1 alternately reads in the outputs from vibration sensors 6 and 7 in the pitch and yaw directions through the A/D conversion input terminals, and performs digital filter calculation. The MPU 1 then obtains the current value (PWM duty) to be supplied to the coil from the calculation result so as to set the desired driving position of the correction lens 12. The MPU 1 sets this value in a predetermined register to drive the correction lens 12.

If the shutter button is pressed to the first and second strokes at once, the MPU 1 performs digital filter calculation after AF processing by using the values stored in the memory 2 with respect to the axis for which digital filtering is interrupted. After no value is left in the memory 2, the MPU 1 drives the correction lens 12. This is because, digital filter output values during interruption of digital filter calculation (during AF processing) or immediately after resumption differ from those when digital filter calculation is continued without being interrupted.

As described above, when the load of processing other than vibration prevention control is heavy in the MPU 1 which performs AF calculation processing, digital filtering of a hand vibration signal in one axial direction (pitch or yaw direction) is interrupted in accordance with the output from the posture sensor 13. During this interruption, the MPU 1 reads in the outputs from the vibration sensors 6 and 7, and terminates the AF calculation processing. If the load on the MPU 1 decreases, the MPU 1 resumes IS calculation. After the resumption of this calculation, the MPU 1 performs calculation processing of the hand vibration signal by using the data read in during the interruption, thereby preventing a deterioration in image quality due to insufficient hand vibration correction control.

The effects of the above embodiments will be described again.

1) When a heavy load is imposed on the MPU 1 in performing AF calculation processing, calculation processing of a hand vibration signal is interrupted. During this interruption, the MPU 1 reads in the data from the vibration sensors 6 and 7. After the AF calculation processing is completed and the load on the MPU 1 decreases, the MPU 1 resumes vibration prevention calculation. After the resumption of this calculation, the MPU 1 performs calculation processing of a hand vibration signal by using the data read during the interruption. This can prevent a deterioration in image quality due to insufficient hand vibration correction control and ensure a high AF calculation precision.

2) Calculation processing of a hand vibration signal in the pitch or yaw direction is interrupted in accordance with the state of the load on the MPU 1 and the output from the posture sensor 13. During interruption, the MPU 1 reads in the data from the vibration sensors 6 and 7, and terminates the AF calculation processing. After the load on the MPU 1 decreases, the MPU 1 resumes vibration prevention calculation in the pitch or yaw direction. After the resumption of this calculation, the MPU 1 performs calculation processing of a hand vibration signal by using the data read during the interruption.

If it is determined on the basis of the output from the posture sensor 13 that the posture of the hand vibration prevention device is a so-called longitudinal position, the MPU 1 interrupts calculation processing of a hand vibration signal in the pitch direction. During interruption, the MPU 1 reads in the output from the vibration sensor 6. After the AF calculation processing is completed and the load on the MPU 1 decreases, the MPU 1 resumes vibration calculation in the pitch direction. After the resumption of this calculation, the MPU 1 performs calculation processing of a hand vibration signal by using the data read during the interruption. In contrast to this, if it is determined on the basis of the data from the MPU 13 that the posture of the hand vibration prevention device is a so-called transverse position, the MPU 1 interrupts calculation processing of a hand vibration signal in the yaw direction. During this interruption, the MPU 1 reads in the output from the vibration sensor 7. After the AF calculation processing is completed and the load on the MPU 1 decreases, the MPU 1 resumes vibration calculation in the yaw direction. After the resumption of this calculation, the MPU 1 performs calculation processing of a hand vibration signal by using the data read during the interruption. This can prevent a deterioration in image quality due to insufficient hand vibration correction control and ensure a high AF calculation precision.

In each embodiment described above, the present invention is applied to the camera. However, the present invention can also be applied to a device having a vibration prevention function and a device having a focus adjusting function.

Although AF calculation processing is presented as an example of processing that imposes a heavy load on the MPU, the present invention is not limited to this. For example, any calculation, e.g., photometry calculation for measuring object brightness, is possible as long as it becomes a load on the MPU other than calculation of a hand vibration signal.

As described above, according to the first and second embodiments of the present invention, there is provided an optical device that can prevent a deterioration in image quality due to insufficient vibration correction control and ensure a high precision of calculation of information for focus adjustment of an optical system.

(Third Embodiment)

Figure 6:
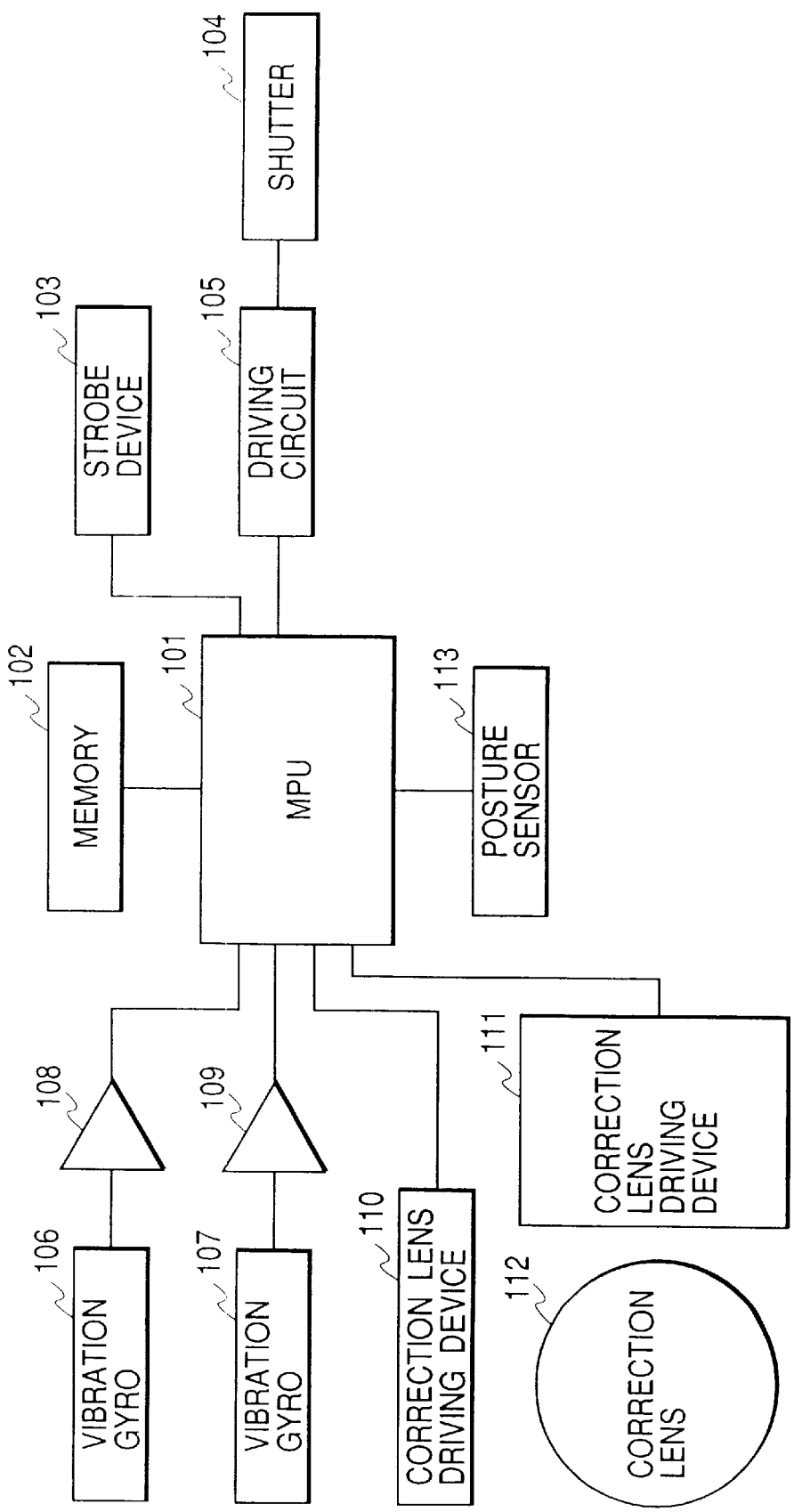
FIG. 6 is a block diagram showing the circuit arrangement of a camera having an image blur correction function according to the third and fourth embodiments of the present invention.
Figure 7:
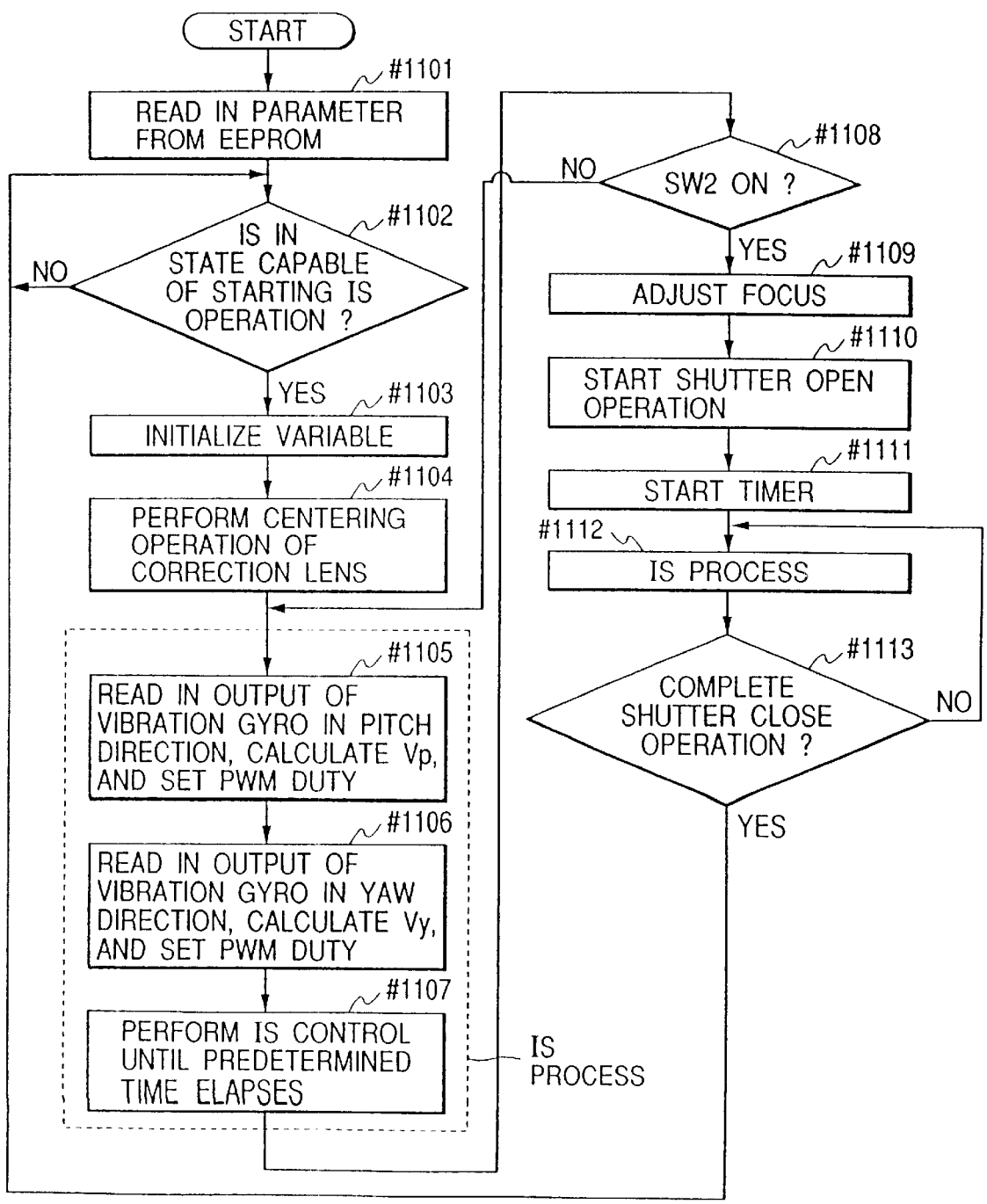
FIG. 7 is a flow chart showing part of the operation of the camera having the image blur correction function according to the third embodiment of the present invention.

FIG. 6 is a block diagram showing the circuit arrangement of a camera having an image blur correction function according to the third embodiment of the present invention.

This camera includes an MPU (microprocessor unit) 101, memory 102, strobe device 103, shutter 104, driving circuit 105 for driving the shutter 104, vibration gyro 106 for detecting vibrations in the pitch direction, vibration gyro 107 for detecting vibrations in the yaw direction, amplifiers 108 and 109 for amplifying the outputs from the vibration gyros 106 and 107, correction lens driving device 110 for driving a correction lens 112 to correct an image blur produced by hand vibrations in the pitch direction, correction lens driving device 111 for driving the correction lens 112 to correct an image blur produced by hand vibrations in the yaw direction, and posture sensor 113 for detecting the posture of the camera.

Referring to FIG. 6, the outputs of the vibration gyros 106 and 107 are connected to the A/D conversion input terminals of the MPU 101 through the amplifiers 108 and 109.

In this embodiment, the camera is controlled by using the angular velocities of hand vibrations of the camera which are detected by the vibration gyros 106 and 107. That is, hand vibration correction is performed by driving the correction lens 112 in a direction to correct the hand vibrations at speeds corresponding to the angular velocities of hand vibrations.

A sequence for correction of an image blur produced by hand vibrations or the like will be described below with reference to the flow charts of FIGS. 7 and 8A to 8C.

When the main sequence of the camera is started by, for example, turning on the main switch of the camera, the MPU 101 reads in various parameters from an EEPROM (not shown) in a series of operations in initialization processing and stores the parameters at predetermined addresses in the memory 102 in step #1101. The flow then advances to step #1102. If it is determined in step #1102 that a photographer has instructed the start of a series of operations of a vibration prevention system by turning on a switch SW1 upon pressing the release button to the first stroke (IS operation is started but blur correction has not been performed yet), the flow advances to step #1103 to initialize the variables to be used in the processing.

In step #1104, the MPU 101 performs centering operation of the correction lens 112. More specifically, the MPU 101 causes the correction lens driving devices 110 and 111 to move the correction lens 112 to an end point on one side. That is, the MPU 101 causes the motors in the correction lens driving devices 110 and 111 to move the correction lens 112 in predetermined directions. The MPU 101 detects the position of the correction lens 112 with a position sensor (not shown). When the correction lens 112 reaches a predetermined position, the MPU 101 stops driving the motors. In practice, since the driving amount in the pitch direction differs from that in the yaw direction, the driving of one of the motors which corresponds to the direction in which the correction lens 112 reaches the predetermined direction is stopped first. This predetermined value corresponds to the end point on one side in the moving range of the correction lens 112. Thereafter, the MPU 101 drives the correction lens 112 in a predetermined direction (opposite to the direction in which the correction lens 112 is moved to one side) for a predetermined period of time at a predetermined speed, thereby centering the correction lens 112 at substantially the center of the moving range of the correction lens 112.

The following processing is performed in step #1105.

The MPU 101 reads in the output from the vibration gyro 106, which detects vibrations in the pitch direction, through the A/D conversion input terminal. The hand vibration signal read in through the amplifier 108 exhibits the median value in the A/D conversion input range when the angular velocity of a hand vibration is zero; an output larger than the median value when the angular velocity of a hand vibration is positive; and an output smaller than the median value when the angular velocity of a hand vibration is negative. The MPU 101 therefore obtains a value Vp by subtracting a median value Vo in the A/D conversion input range from each output value Vin read in through the A/D conversion input terminal, and controls the correction lens 112 by using the value Vp.

The MPU 101 obtains the driving speed of the correction lens 112 from the value Vp. In this embodiment, the correction lens 112 is driven by a motor whose rotational speed is proportional to the current supplied to the motor.

The MPU 101 obtains a current value for giving the motor a desired rotational speed from the value Vp. In this case, the current to be supplied to the motor is not supplied as an analog quantity but as a digital quantity having undergone PWM (Pulse Width Modulation). This is because, for example, it is advantageous in terms of cost to control a current as a digital quantity by using the MPU 101. For this reason, a table for obtaining a PWM duty from the value Vp is prepared, and the MPU 101 obtains the address in the memory at which the corresponding PWM duty is stored from the value Vp and reads in the corresponding value, thereby setting a PWM duty. Note that this table is preferably set in the EEPROM.

When a PWM cycle and PWM duty is obtained in this manner, the MPU 101 sets this value in a predetermined register. With this operation, a PWM driving signal is supplied to the correction lens driving device 110. Upon reception of the driving signal, the correction lens driving device 110 drives the correction lens 112 in the pitch direction (vertical direction) until the next driving signal is received. That is, the correction lens driving device 110 keeps driving the correction lens 112 at a constant speed in accordance with the currently received driving signal until the next driving signal is received.

The flow then advances to step #1106 to perform the following processing.

The MPU 101 reads in the output from the vibration gyro 107, which detects vibrations in the yaw direction, through the amplifier 109 and the A/D conversion input terminal. The MPU 101 obtains a value Vy by subtracting the median value Vo in the A/D conversion input range from each output value Vin read in through the A/D conversion input terminal, and controls the correction lens 112 by using this value Vy.

The MPU 101 obtains a current value for setting a driving speed of the correction lens 112, i.e., a desired rotational speed of the motor, from the above value Vy. As described above, the current to be supplied to the motor is not supplied as an analog quantity but is supplied as a digital quantity having undergone PWM (Pulse Width Modulation). For this reason, as in the operation in the pitch direction, a table for obtaining a PWM duty from the value Yy is prepared, and the MPU 101 obtains the address in the memory at which the corresponding PWM duty is stored from the value Yy and reads in the corresponding value, thereby setting a PWM duty. Note that this table is preferably set in the EEPROM.

When a PWM cycle and PWM duty is obtained, the MPU 101 sets this value in a predetermined register. With this operation, a PWM driving signal is supplied to the correction lens driving device 111. Upon reception of the driving signal, the correction lens driving device 111 keeps driving the correction lens 112 in the pitch direction (vertical direction) until the next driving signal is supplied. That is, the correction lens driving device 111 keeps driving the correction lens 112 in accordance with the currently supplied driving signal until the next driving signal is supplied.

If the MPU 101 starts driving the correction lens 112 in this manner, the flow advances to step #1107 to perform IS control for stabilizing the correction lens 112 for a predetermined period of time. More specifically, as in the above case, the MPU 101 alternately reads in the outputs from the vibration gyros in the pitch and yaw directions, and obtains a current value (PWM duty) that give the motor a desired rotational speed from the read values, and sets the obtained value in a predetermined register, thereby driving the correction lens 112. The operation in steps #1105 to #1107 will be referred to as IS processing.

If it is determined in step #1108 that the photographer has generated a photographing request (e.g., a shutter driving request) by turning on the switch SW2 upon pressing the release button to the second stroke during IS processing, the MPU 101 performs the processing in step #1109 and the subsequent steps, e.g., starting shutter open operation, after a lapse of a predetermined wait time. Obviously, if it is determined that a photographing request (e.g., a shutter driving request) is generated after a lapse of a wait time, the flow immediately advances to the step of starting shutter open operation or the like.

If no photographing request is generated, the flow returns to steps #1105 to #1107 to perform IS processing.

In starting shutter open operation or the like, the MPU 101 drives the focus adjusting lens to adjust the focus in step

1109. The MPU 101 then starts driving the shutter on the basis of the photometry result obtained in advance. That is, the MPU 101 initiates the timer to start shutter close operation and processing associated with strobe lighting upon generation of interrupts by the timer.

More specifically, if the MPU 101 determines on the basis of the photometry result that strobe light must be emitted by the strobe device 103, the MPU 101 initiates two timers. Otherwise, the MPU 101 initiates one timer. In practice, when shutter open operation is started (step #1110) and the timer is initiated (step #1111), the flow advances to the step of performing IS processing (step #1112). The IS processing performed in this case is the same as that in steps #1105 to #1107.

During shutter open operation, the MPU 101 alternately reads in the outputs from the vibration gyros 106 and 107 in the pitch and yaw directions through the A/D conversion input terminals, and obtains a current value (PWM duty) for giving the motor a desired rotational speed from the read value. The MPU 101 then sets this value in a predetermined register to drive the correction lens 112. The MPU 101 continues this IS operation until the timer generates an interrupt.

When the two timers are initiated, one of the timers generates an interrupt for strobe lighting. When this interrupt is generated, the MPU 101 shifts the flow to the routine in FIG. 8A. First of all, in step #1151, the MPU 101 permits a timer interrupt for interpolation, and permits interpolation processing controlled in accordance with the flow chart of FIG. 8C to be described later. As will be described later, a preprocess for strobe lighting is a considerably heavy load on the MPU 101. For this reason, a delay occurs in IS (image blur correction) processing. As a result, when the correction lens 112 is driven, a deterioration in image quality may occur instead of an improvement in image quality. The above operation is performed to prevent this.

The flow then advances to step #1152 to perform a preprocess for strobe lighting. That is, the MPU 101 checks whether the shutter has opened by a predetermined amount. This predetermined amount is determined by the guide number of the strobe device and the photometry measurement obtained in advance. The opening amount of the shutter is detected by a position sensor (not shown). The MPU 101 detects the opening position of the shutter with the position sensor (not shown). When the shutter opens to a predetermined position, the MPU 101 finishes this preprocess. The flow then advances to step #1153 to perform strobe lighting. Obviously, if no strobe lighting is required, this processing is not performed, and the timer for this operation is not initiated.

Figure 8A:
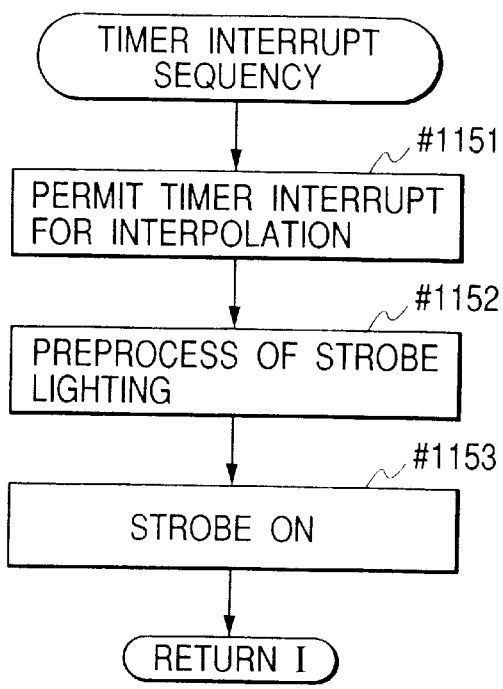
FIGS. 8A, 8B and 8C are flow charts showing another operation of the camera having the image blur correction function according to the third embodiment of the present invention.
Figure 8B:
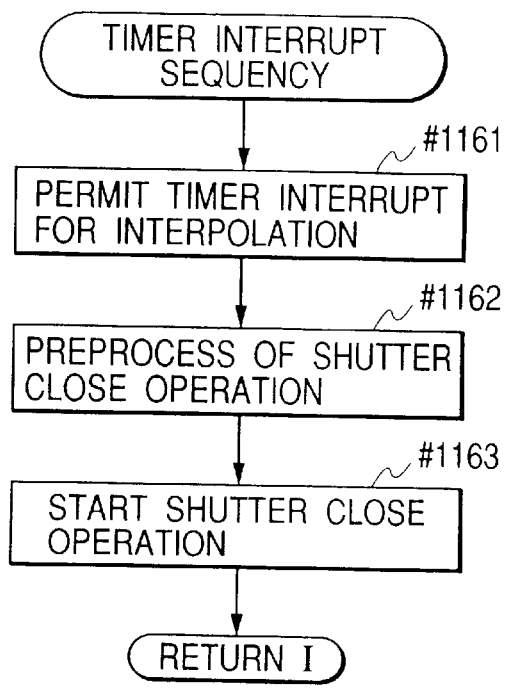
Figure 8C:
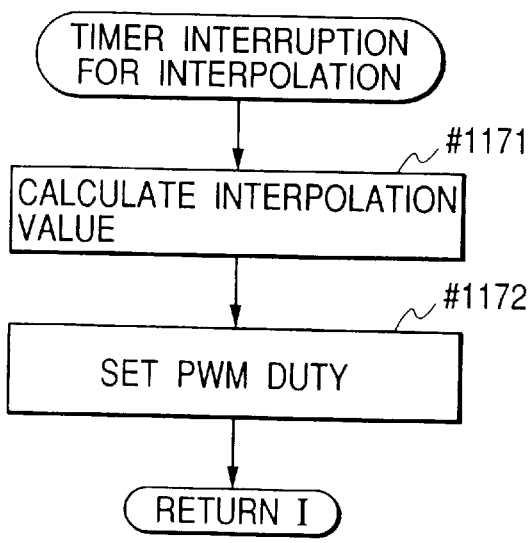
Figure 9:
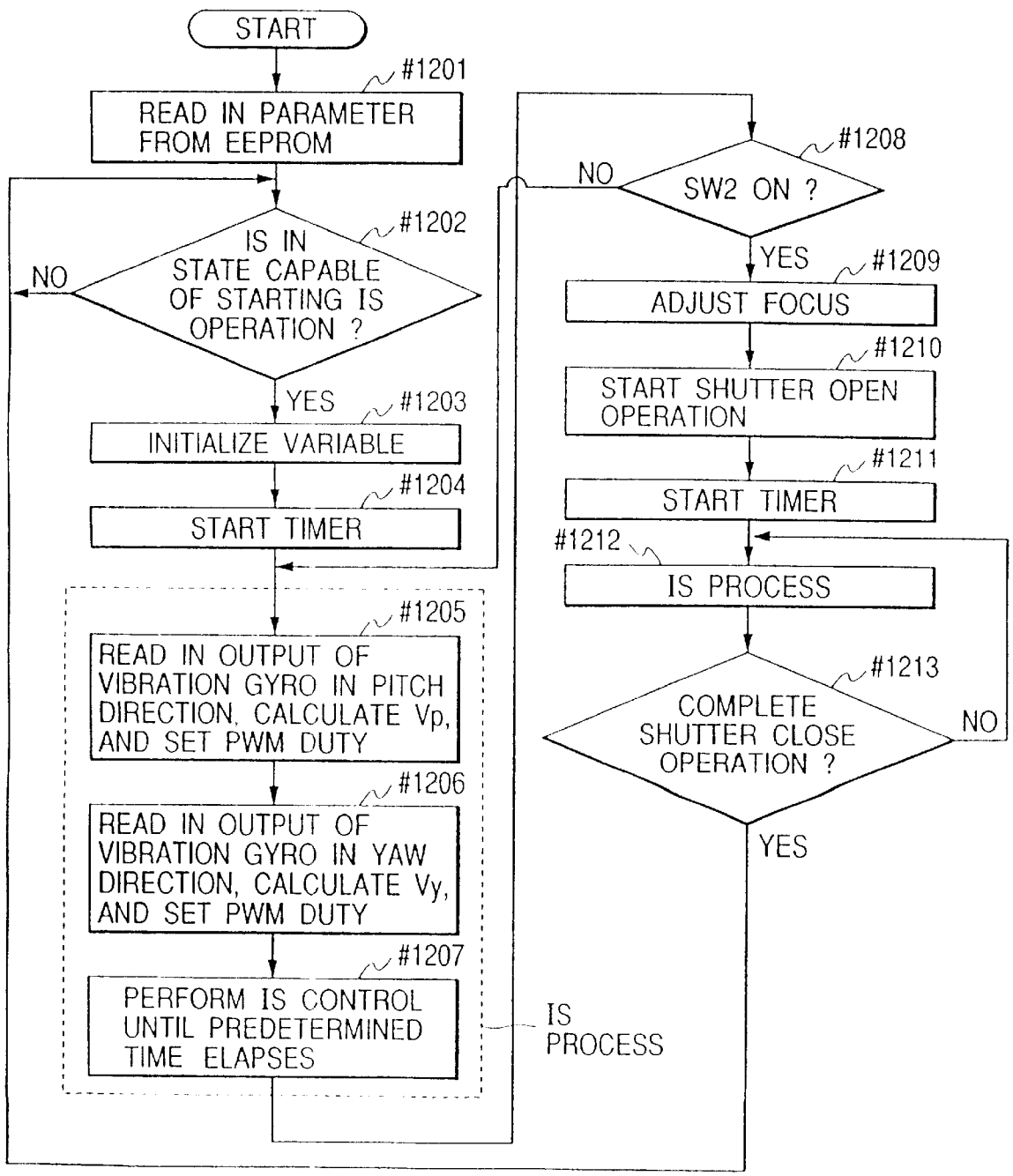
FIG. 9 is a flow chart showing part of the operation of the camera having the image blur correction function according to the fourth embodiment of the present invention.

Interpolation processing to be controlled in accordance with the flow chart of FIG. 8C, which is permitted in step #1151, will be described below.

Since timer interrupt is permitted in step #1151, an interrupt is generated at predetermined intervals during a preprocess for strobe lighting, and interpolation processing for IS operation is performed at the interrupt timing.

During this period, the MPU 101 does not perform A/D conversion and obtains a new PWM duty from the timing produced by the interrupt and two PWM duties (corresponding to current values for giving the motor a desired rotational speed) immediately before interpolation processing in steps #1171 and #1172. More specifically, assuming that a PWM duty linearly changes during this interpolation interval, the MPU 101 obtains a PWM duty at the ith interrupt from the start of interpolation by using two PWM duties PWM(n-1) and PWM(n-2) immediately before interpolation processing according to the following equation:

$$PWM(n+m) = a \times (n+m) + b$$

for $a = PWM(n-1) - PWM(n-2)$ $b = (n-1) \times PWM(n-2) - (n-2) \times PWM(n-1)$ $m = i - 1$ In this case, the time point at which interpolation starts (the time point at which the first interrupt for giving an interpolation timing is generated) is represented by t=n, the PWM duty at this time point is represented by PWM(n), and the PWM duty at the ith interrupt from the start of interpolation is represented by PWM(n+m). The obtained PWM duty (the value of PWM(n+m)) is set in a predetermined register to give the motor a desired rotational speed, thereby driving the correction lens.

The interrupt for the timing of this interpolation is set in advance, and only permission of the interrupt is performed in this case. When the normal state is restored from the interrupt for strobe lighting, the interrupt for obtaining the timing of this interpolation is inhibited.

When the normal state is restored from this strobe lighting, IS processing is performed again (step #1112). That is, the MPU 101 alternately reads in the outputs from the vibration sensors in the pitch and yaw directions through the A/D conversion input terminals, and obtains a current (PWM duty) for giving the motor a desired rotational speed. The MPU 101 then sets this value in a predetermined register to drive the correction lens 112.

When a timer interrupt for the start of shutter open operation is generated as well, the MPU 101 shifts to the mode of interpolating the control signal to be output. In this case, the flow shifts to the routine shown in FIG. 8B, and the MPU 101 permits a timer interrupt for interpolation in step #1161. As will be described later, a preprocess for the start of shutter close operation is a considerably heavy load on the MPU 101. For this reason, a delay occurs in IS processing. As a result, when the correction lens 112 is driven, a deterioration in image quality may occur instead of an improvement in image quality. The above operation is performed to prevent this.

The flow then advances to step #1162, and the MPU 101 performs a preprocess for shutter close operation. That is, the MPU 101 checks whether the shutter has opened by a predetermined amount. This predetermined amount is determined by the photometry result obtained in advance. That is, the MPU 101 detects the opening position of the shutter with a position sensor (not shown). If the shutter has opened to a predetermined position, the MPU 101 stops shutter open operation. The flow then advances to step #1163 to start shutter close operation.

Since a timer interrupt is permitted in step #1161, an interrupt is generated. Every time an interrupt is generated, steps #1171 and #1172 are executed to interpolate the control signal to be output.

During this period, the MPU 101 does not perform A/D conversion and obtains a new PWM duty from the timing produced by the interrupt and two PWM duties (corresponding to current values for giving the motor a desired rotational speed) immediately before the interpolation processing. Assuming that a PWM duty linearly changes during this interpolation interval, the MPU 101 obtains a PWM duty at the ith interrupt from the start of interpolation by using two PWM duties PWM(n-1) and PWM(n-2) immediately before interpolation processing according to the following equation:

$$PWM(n+m)=a \times (n+m)+b$$

for $a=PWM(n-1)-PWM(n-2)$ $$b=(n-1) \times PWM(n-2)-(n-2) \times PWM(n-1)$$

$$m=i-1$$

In this case, the time point at which interpolation starts (the time point at which the first interrupt for giving an interpolation timing is generated) is represented by t=n, the PWM duty at this time point is represented by PWM(n), and the PWM duty at the ith interrupt from the start of interpolation is represented by PWM(n+m). The obtained PWM duty (the value of PWM(n+m)) is set in a predetermined register to give the motor a desired rotational speed, thereby driving the correction lens.

The interrupt for the timing of this interpolation is set in advance, and only permission of the interrupt is performed in this case. When the normal state is restored from the interrupt for strobe lighting, the interrupt for obtaining the timing of this interpolation is inhibited.

When the normal state is restored from the interrupt for the start of this shutter close operation, the MPU 101 performs IS processing (step #1112) again. That is, the MPU 101 alternately reads in the outputs from the vibration sensors in the pitch and yaw directions through the A/D conversion input terminals, and obtains a current value (PWM duty) for giving the motor a desired rotational speed. The MPU 101 then sets this value in a predetermined register to drive the correction lens 112.

In the above manner, the MPU 101 keeps performing IS processing (improving image quality by driving the correction lens) until the shutter closes completely. That the shutter is closed completely can be known by using a switch that is turned on when the shutter closes. If the MPU 101 determines in step #1113 that the shutter is closed completely, the MPU 101 stops driving the correction lens 112. The flow then returns to step #1102.

According to the third embodiment described above, when processing other than driving control (IS control) on the correction lens 112 imposes a heavy load on the MPU 101 which performs processing for closing the shutter in shutter driving operation and processing for the start of strobe lighting, the control signals to be output to the correction lens driving devices 110 and 111 are interpolated. This can prevent a deterioration in image quality due to insufficient image blur correction control and also prevent improper shutter control and strobe lighting.

(Fourth Embodiment)

In a camera having an image blur correction function according to the fourth embodiment of the present invention, a position signal is obtained by integrating the angular velocities of the hand vibrations of the camera which are detected by a vibration gyro, and control is performed by using the resultant value. That is, hand vibration correction is performed by driving the correction lens in a direction to correct the hand vibrations by an amount corresponding to the hand vibration amount. The output from the vibration gyro may be integrated before A/D conversion by an integration circuit provided outside the MPU. In this embodiment, however, this integration is performed after A/D conversion by the MPU using a so-called digital filter.

The circuit arrangement of the camera having the image blur correction function according to the fourth embodiment of the present invention is the same as that shown in FIG. 6.

A sequence of correction of an image blur produced by hand vibrations will be described below with reference to flow charts of FIGS. 9 and 10A to 10C.

When the main sequence of the camera is started by, for example, turning on the main switch of the camera, an MPU 101 reads in various parameters from an EEPROM (not shown) in a series of operations in initialization processing and stores the parameters at predetermined addresses in a memory 102 in step #1201. The flow then advances to step #1202. If it is determined that a photographer has instructed the start of a series of operations of a vibration prevention system by turning on a switch SW1 upon pressing the release button to the first stroke (IS operation is started but blur correction has not been performed yet), the flow advances to step #1203 to initialize the variables to be used in the processing. In this embodiment, since a driving device using a moving magnet (MM) is used, the correction lens 112 is located in substantially the center owing to a spring mounted on the moving magnet (MM) while no current is supplied to the coil. Therefore, there is no need to perform centering as in the first embodiment.

In step #1204, the MPU 101 initiates a timer for obtaining the timing of sampling. This timer generates an interrupt at predetermined intervals. The intervals are determined in accordance with the hand vibration correction ability and are generally set to about 500 μsec to 1 msec.

Every time the timer generates an interrupt, the MPU 101 alternately reads in the outputs from vibration gyros 106 and 107, which detect vibrations in the pitch and yaw directions, through the A/D conversion input terminals. First of all, in step #1205, the MPU 101 performs the following processing.

The MPU 101 reads in the output from the vibration gyro 106, which detects vibrations in the pitch direction, through the amplifier 108 and the A/D conversion input terminal. This hand vibration signal exhibits the median value in the A/D conversion input range when the angular velocity of a hand vibration is zero; an output larger than the median value when the angular velocity of a hand vibration is positive; and an output smaller than the median value when the angular velocity of a hand vibration is negative. The MPU 101 therefore subtracts a median value Vo in the A/D conversion input range from each output value Vin read in from the A/D conversion input terminal to obtain a value Vp, and controls the correction lens 112 by using the value obtained by integrating the values Vp.

The MPU 101 performs digital filtering by using the value Vp. In this case, the MPU 101 concurrently performs integration and high-pass filtering before the integration. High-pass filtering is performed to prevent slight offset components superimposed on the value Vp from being integrated so as to prevent the integrated value from overflowing. The design of the digital filter to be used changes depending on the hand vibration correction precision required and the like based on the frequency band of hand vibrations to be corrected and the performance of the camera. In this case, two pairs of high-pass filters and integrators respectively having poles of 1 Hz and 0.2 Hz are designed. During control, these pairs are switched from the one having a pole of 1 Hz to the one having a pole of 0.2 Hz. This can eliminate any phase error during control and stabilize the filter output at an early stage. This switching of frequencies as poles is termed as "time constant switching".

In practice, the MPU 101 sequentially obtains outputs according to the following equation:

$$Yp_n = a1 \times (Xp_{n-2} - Xp_n) + a2 \times Yp_{n-1} + a3 \times Yp_{n-2}$$

Parameters a1, a2, and a3 in the above equation are changed in time constant switching. This switching operation is performed about one sec after the start of integration.

The value $Xp_n$ is a filter input value at an nth sampling point n in the pitch direction, i.e., the value Vp. The values $Xp_n$ and $Yp_n$ are filter output values at the nth sampling point n in the pitch direction. The values $Xp_n$ and $Yp_n$ are filter input and output values at the nth sampling point n in the pitch direction. The values $Xp_{n-1}$ and $Yp_{n-1}$ are filter input and output values at an (n−1)th sampling point n−1 in the pitch direction. The values $Xp_{n-2}$ and $Yp_{n-2}$ are filter input and output values at an (n−2)th sampling point n−2 in the pitch direction.

Assume that the values $Xp_{n-2}$, $Yp_{n-1}$, and $Yp_{n-2}$ are zero at the first sampling (n=0). Likewise, the values $Xp_{n-2}$ and $Yp_{n-2}$ are zero at the second sampling (n=1).

The MPU 101 then obtains the driving position of the correction lens 112 from the value $Yp_n$. This embodiment uses a driving device using a moving magnet (MM) to move the correction lens 112 to a position proportional to the current supplied to the coil.

The MPU 101 obtains the current value to be supplied to the coil from the value $Yp_n$. In this case, the current to be supplied to the coil is not supplied as an analog quantity but as a digital quantity having undergone PWM (Pulse Width Modulation). This is because, for example, it is advantageous in terms of cost to control a current as a digital quantity by using the MPU 101. For this reason, a table for obtaining a PWM duty from the value $Yp_n$ is prepared, and the MPU 101 obtains the address in the memory at which the corresponding PWM duty is stored from the value $Yp_n$ and reads in the corresponding value, thereby setting a PWM duty. Note that this table is preferably set in the EEPROM.

When a PWM cycle and PWM duty is obtained in this manner, the MPU 101 sets this value in a predetermined register. With this operation, a PWM driving signal is supplied to a correction lens driving device 110. Upon reception of the driving signal, the correction lens driving device 110 supplies a current proportional to the supplied signal to the coil to drive the correction lens 112 to a predetermined position in the pitch direction (vertical direction). That is, the correction lens 112 is held at the predetermined position in accordance with the supplied driving signal until the next driving signal is supplied.

When the timer generates the next interrupt, the flow advances to step #1206 to detect vibrations in the yaw direction. The MPU 101 then performs the following processing.

The MPU 101 reads in the output from the vibration gyro 107 through an amplifier 109 and the A/D conversion input terminal. The MPU 101 obtains a value Vy by subtracting the median value Vo in the A/D conversion input range from the output value Vin read in through the A/D conversion input terminal, and controls the correction lens 12 by using the value Vy.

The MPU 101 performs digital filtering by using the value Vy. In this case, the MPU 101 concurrently performs integration and high-pass filtering before the integration. At this time, two pairs of high-pass filters and integrators respectively having poles of 1 Hz and 0.2 Hz are designed. During control, these pairs are switched from the one having a pole of 1 Hz to the one having a pole of 0.2 Hz. This switching of frequencies as poles is termed as "time constant switching", as described above.

In practice, the MPU 101 sequentially obtains outputs according to the following equation:

$$Yy_n = a1 \times (Xy_{n-2} - Xy_n) + a2 \times Yy_{n-1} + a3 Yy_{n-2}$$

Parameters a1, a2, and a3 in the above equation are changed in time constant switching. This switching operation is performed about one sec after the start of integration. The value $Xy_n$ is a filter input value at the nth sampling point n in the yaw direction, i.e., the value Vy. The $Yy_n$ is a filter output value at the nth sampling point n in the yaw direction. The values $Xy_{n-1}$ and $Yy_{n-1}$ are input and output values at the (n−1)th sampling point n−1 in the yaw direction. The values $Xy_{n-2}$ and $Yy_{n-2}$ are input and output values at the (n−2)th sampling point n−2 in the yaw direction.

Assume that the values $Xy_{n-2}$, $Yy_{n-1}$, and $Yy_{n-2}$ are zero at the first sampling (n=0). Likewise, the values $Xy_{n-2}$ and $Yy_{n-2}$ are zero at the second sampling (n=1).

The MPU 101 obtains the driving position of the correction lens 112 from the value $Yy_n$. This embodiment uses the driving device using the moving magnet (MM) to move the correction lens 112 to a position proportional to the current supplied to the coil.

The MPU 101 obtains the current value to be supplied to the coil from the value $Yy_n$. In this case, the current to be supplied to the coil is not supplied as an analog quantity but as a digital quantity having undergone PWM (Pulse Width Modulation). For this reason, a table for obtaining a PWM duty from the value $Yy_n$ is prepared, and the MPU 1 obtains the address in the memory at which the corresponding PWM duty is stored from the value $Yy_n$ and reads in the corresponding value, thereby setting a PWM duty. Note that this table is preferably set in an EEPROM.

When a PWM cycle and PWM duty is obtained in this manner, the MPU 101 sets this value in a predetermined register. With this operation, a PWM driving signal is supplied to the correction lens driving device 111. Upon reception of the driving signal, the correction lens driving device 111 supplies a current proportional to the supplied signal to the coil to drive the correction lens 112 to a predetermined position in the yaw direction (horizontal direction). That is, the correction lens 112 is held at the predetermined position in accordance with the supplied driving signal until the next driving signal is supplied.

When driving of the correction lens 112 is started in this manner, IS control for stabilizing the driving of the correction lens 112 is performed for a predetermined period of time in step #1207. More specifically, as described above, the MPU 101 alternately reads in the outputs from the vibration gyros 106 and 107 in the pitch and yaw directions through the A/D conversion input terminals every time the timer generates an interrupt. The MPU 101 then performs digital filter calculation and obtains the current (PWM duty) to be supplied to the coil from the calculation result so as to supply the desired driving position of the correction lens 112. The MPU 101 drives the correction lens 112 by setting this value in a predetermined register. The operation in steps #1205 to #1207 will be referred to as IS processing.

If it is determined in step #1208 that the photographer has generated a photographing request (e.g., a shutter driving request) by turning on a switch SW2 upon pressing the release button to the second stroke during IS processing, the MPU 101 performs the processing in step #1209 and the subsequent steps, e.g., starting shutter open operation, after a lapse of a predetermined wait time. Obviously, if it is determined that a photographing request (e.g., a shutter driving request) is generated after a lapse of a wait time, the flow immediately advances to the step of starting shutter open operation or the like.

If no photographing request is generated, the flow returns to steps #1205 to #1207 to perform IS processing again.

In starting shutter open operation or the like, the MPU 101 drives the focus adjusting lens to adjust the focus in step #1209. The MPU 101 then starts driving the shutter on the basis of the photometry result obtained in advance. That is, the MPU 101 initiates the timer to start shutter close operation and processing associated with strobe lighting upon generation of interrupts by the timer.

More specifically, if the MPU 101 determines on the basis of the photometry result that strobe lighting is required, the MPU 101 initiates two timers. Otherwise, the MPU 101 initiates one timer. In practice, when shutter open operation is started (step #1210) and the timer is initiated (step #1211), the flow advances to the step of performing IS operation (step #1212).

During shutter open operation, the MPU 101 alternately reads in the outputs from the vibration gyros 106 and 107 in the pitch and yaw directions through the A/D conversion input terminals every time a timer interrupt is generated as described above, and obtains the current value (PWM duty) to be supplied to the coil. The MPU 101 then sets this value in a predetermined register to drive the correction lens 112. The MPU 101 continues this IS operation until the timer generates the next interrupt.

When the two timers are initiated, one of the timers generates an interrupt for strobe lighting. When this interrupt is generated, the flow shifts to the routine in FIG. 10A. The MPU 101 then performs interpolation processing in one axial direction according to steps #1251 and #1252 in FIG. 10A and steps #1271 and #1272 in FIG. 10C.

The MPU 101 continues digital filter calculation for the driving of the correction lens 112 in one axial direction, but temporarily stops digital filter calculation in the other direction. During this period, the MPU 101 interpolates the control signal to be output, and drives the correction lens 112.

Since an interrupt for interpolation processing is permitted in step #1251, an interrupt for interpolation is generated at predetermined intervals during a preprocess for strobe lighting.

Every time this interrupt is generated, the MPU 101 obtains a new PWM duty from the timing produced by the interrupt and two PWM duties (corresponding to current values that set the driving position of the correction lens 112) immediately before the start of interpolation processing. More specifically, assuming that a PWM duty linearly changes during this interpolation interval, the MPU 101 obtains a PWM duty at the ith interrupt from the start of interpolation by using two PWM duties PWM(n−1) and PWM(n−2) immediately before interpolation processing according to the following equation:

$$PWM(n+m) = a \times (n+m) + b$$

for $a = PWM(n-1) - PWM(n-2)$ $b = (n-1) \times PWM(n-2) - (n-2) \times PWM(n-1)$ $m = i - 1$ In this case, the time point at which interpolation starts (the time point at which the first interrupt for giving an interpolation timing is generated) is represented by t=n, the PWM duty at this time point is represented by PWM(n), and the PWM duty at the ith interrupt from the start of interpolation is represented by PWM(n+m). The obtained PWM duty (the value of PWM(n+m)) is set in a predetermined register to give the motor a desired rotational speed, thereby driving the correction lens 112.

The interrupt for the timing of this interpolation is set in advance, and only permission of the interrupt is performed in this case. When the normal state is restored from the interrupt for strobe lighting, the interrupt for obtaining the timing of this interpolation is inhibited.

The output from a posture sensor 113 is used to determine the pitch or yaw direction in which digital filter calculation is temporarily stopped to interpolate the output. More specifically, the MPU 101 reads in the output from the posture sensor 113 to determine the posture of the camera. If the result indicates that the camera is oriented in a so-called transverse position, the MPU 101 temporarily stops digital filter calculation in the yaw direction. If the result indicates that the camera is oriented in the longitudinal direction, the MPU 101 temporarily stops digital filter calculation in the pitch direction. The MPU 101 then interpolates the output to drive the correction lens 112. This is because, when the camera is oriented in the transverse direction, hand vibrations are generally strong in the pitch direction, whereas when the camera is oriented in the longitudinal direction, hand vibrations are generally strong in the yaw direction. A better photograph can therefore be taken by correcting a deterioration in image quality in one of the directions in which hand vibrations are stronger.

The MPU 101 temporarily stops digital filter calculation in one axial direction and interpolates the output for the following reason. When the correction lens 112 is driven by performing digital filter calculation in two axial directions, the considerably heavy load of a preprocess for strobe lighting is imposed on the MPU 101, as described above. This may cause a delay in IS processing, resulting in a deterioration in image quality upon driving the correction lens 112 instead of improving the image quality.

Subsequently, the flow advances to step #1253 to check whether the shutter has opened by a predetermined amount. This predetermined amount is determined by the guide number of a strobe device 103 and the photometry result obtained in advance. The opening amount of the shutter is detected by apposition sensor (not shown). The MPU 101 detects the opening position of the shutter with the position sensor (not shown). When the shutter opens to a predetermined position, the flow then advances to step #1254 to perform strobe lighting. Obviously, if no strobe lighting is required, this processing is not performed, and the timer for this operation is not initiated.

When the normal state is restored from this strobe lighting, IS processing is performed again (step #1212) to drive the correction lens 112 in the pitch and yaw directions. That is, every time the timer generates an interrupt as described above, the MPU 101 alternately reads in the outputs from the vibration gyros in the pitch and yaw directions through the A/D conversion input terminals, and performs digital filter calculation. The MPU 101 then obtains the current value (PWM duty) to be supplied to the coil from the calculation result so as to set the desired driving position of the correction lens 112. The MPU 101 sets this value in a predetermined register to drive the correction lens 112.

When a timer interrupt for the start of shutter close operation is generated, the flow shifts to the routine in FIG. 10B to perform the same processing as described above. First of all, in steps #1261 and #1262, on the basis of the output from the posture sensor 113, the MPU 101 determines an axis (pitch or yaw direction) along which interpolation processing is performed. When an interrupt is generated, the MPU 101 performs interpolation processing and drives the correction lens 112.

The flow then advances to step #1263 to perform a preprocess for shutter close operation. That is, the MPU 101 checks whether the shutter has opened by a predetermined amount. This predetermined amount is determined by the photometry result obtained in advance. The opening amount of the shutter is detected by a position sensor (not shown). That is, the MPU 101 detects the opening position of the shutter with the position sensor (not shown). If the shutter has opened to a predetermined position, the MPU 101 stops the shutter open operation, and starts shutter close operation in step #1264. If the MPU 101 determines on the basis of photometry value information or the like that the strobe device 103 should be turned on, the MPU 101 checks, before the above step of checking the opening amount of the shutter, whether the strobe device 103 has already been turned on. If the strobe device 103 has not been turned on, the MPU 101 turns it on at this time.

When the normal state is restored from this interrupt, IS processing is performed again (step #1212) to drive the correction lens 112 in the pitch and yaw directions. That is, every time the timer generates an interrupt as described above, the MPU 101 alternately reads in the outputs from the vibration gyros 106 and 107 in the pitch and yaw directions through the A/D conversion input terminals, and performs digital filter calculation. The MPU 101 then obtains the current value (PWM duty) to be supplied to the coil from the calculation result so as to set the desired driving position of the correction lens 112. The MPU 101 sets this value in a predetermined register to drive the correction lens 112.

The MPU 101 keeps performing IS processing (improving image quality by driving the correction lens) until the shutter is closed completely. The MPU 101 can detect the completely closed state of the shutter by using a switch that is turned on when the shutter is closed. If the MPU 101 detects in step #1213 in FIG. 9 that the shutter has been closed completely, the MPU 101 stops driving the correction lens 112. The flow then returns to step #1202.

According to the fourth embodiment described above, when the load of processing other than driving control (IS control) on the hand vibration correction lens is heavy in the MPU 101 which performs processing for closing the shutter in shutter driving operation and processing for the start of strobe lighting, the MPU 101 temporarily stops driving control (IS control) of the correction lens in one direction. During this operation, the MPU 101 calculates a control signal by interpolation calculation. This can prevent a deterioration in image quality due to insufficient image blur correction control.

(Fifth Embodiment)

Figure 11:
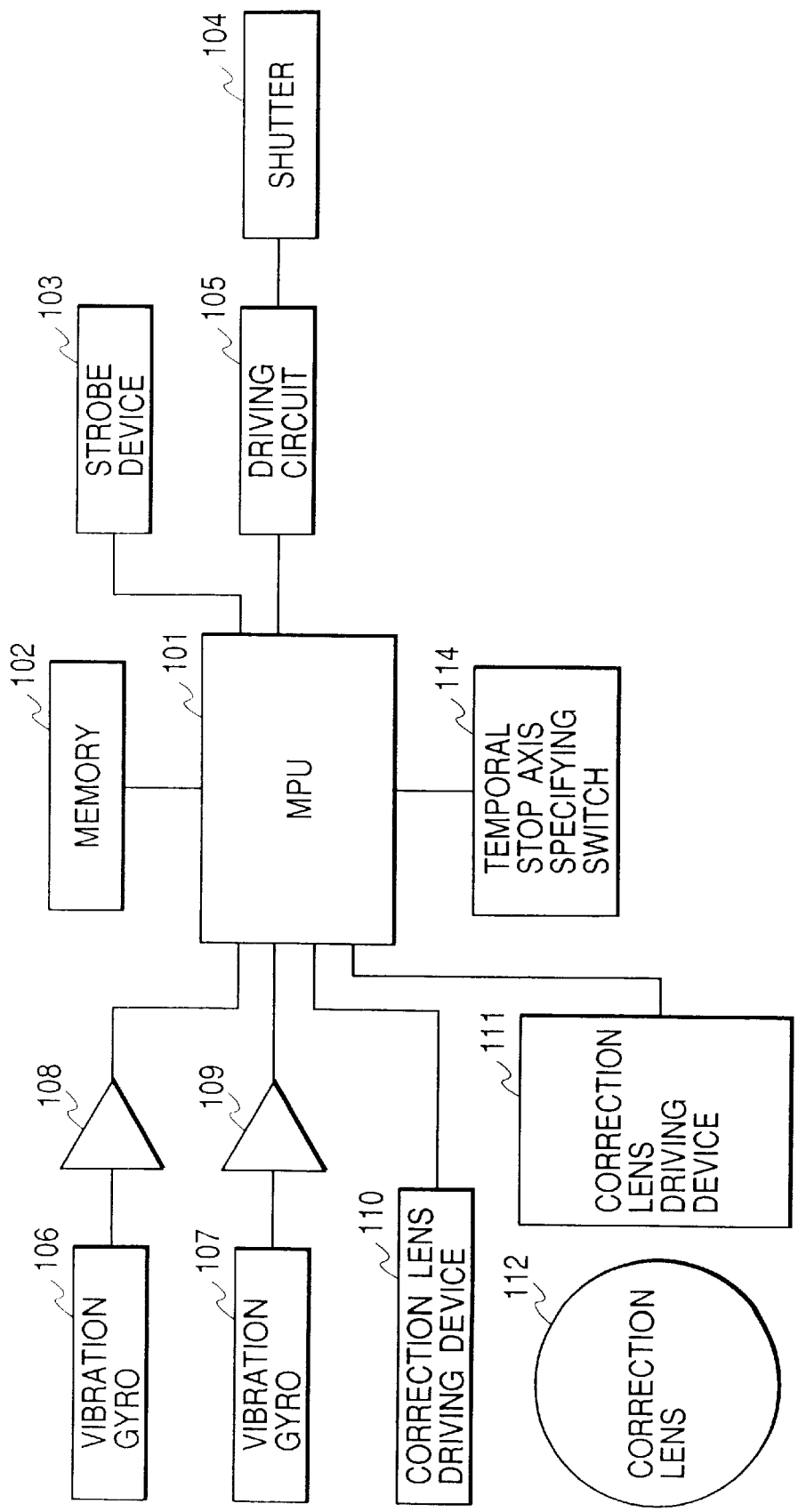
FIG. 11 is a block diagram showing the circuit arrangement of a camera having an image blur correction function according to the fifth embodiment of the present invention.
Figure 12:
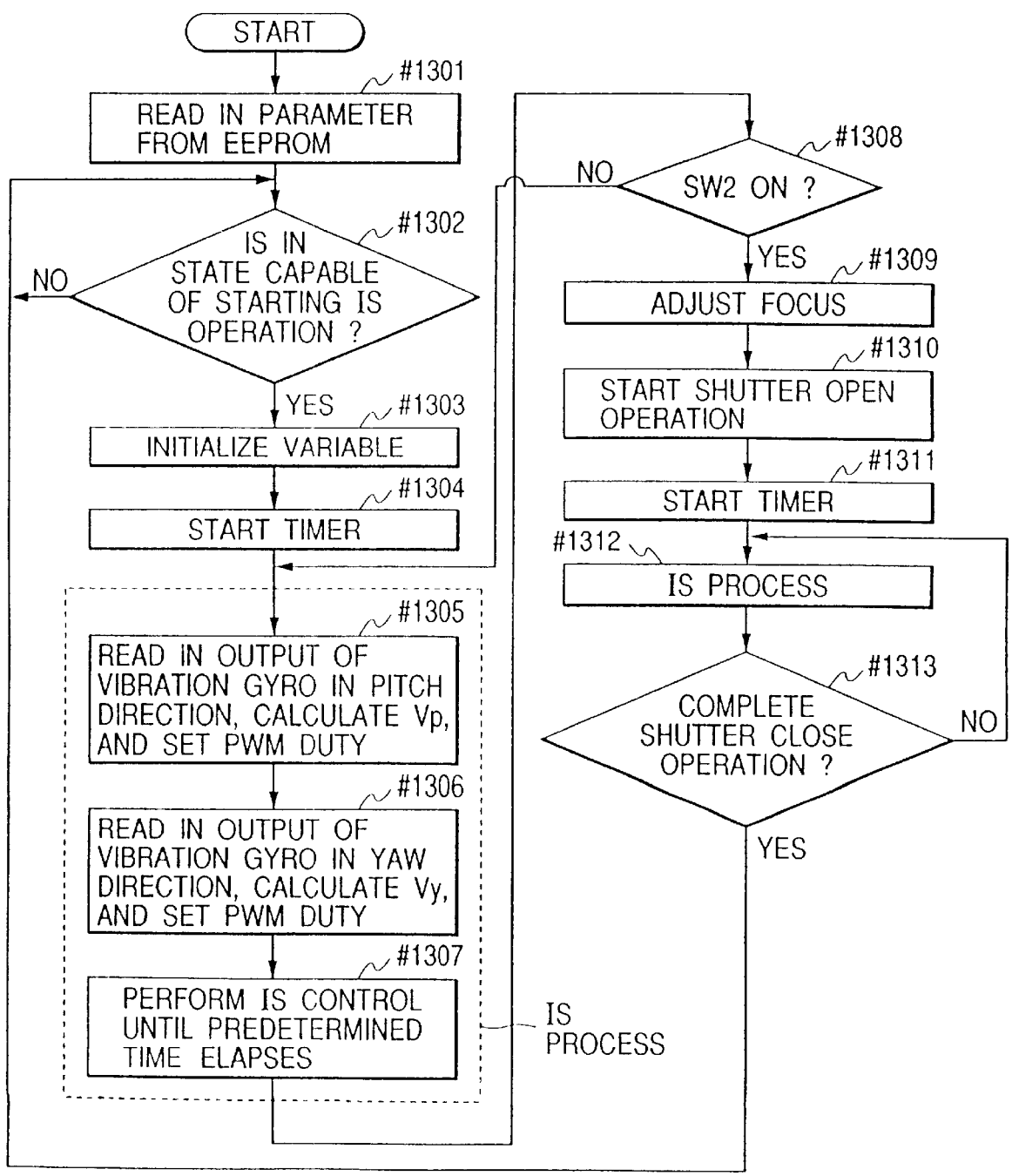
FIG. 12 is a flow chart showing part of the operation of the camera having the image blur correction function according to the fifth embodiment of the present invention.

FIG. 11 is a block diagram showing the circuit arrangement of a camera having an image blur correction function according to the fifth embodiment of the present invention. The same reference numerals as in FIG. 6 denote the same parts in FIG. 11, and a description thereof will be omitted.

Referring to FIG. 11, a temporal stop axis specifying switch 114 specifies an axis along which driving of a correction lens 112 is temporarily stopped when the load of processing other than IS processing is heavy in an MPU 101.

A position signal is obtained by integrating the angular velocities of the hand vibrations of the camera which are detected by vibration gyros, and control is performed by using the obtained value. That is, hand vibrations are corrected by driving a correction lens in a direction to correct the hand vibrations by an amount corresponding to the hand vibration amount. The outputs from the vibration gyros may be integrated before A/D conversion by an integration circuit provided outside an MPU. In this embodiment, however, integration is performed after A/D conversion by the MPU 101 using a so-called digital filter.

In this embodiment, when the load of processing, such as a preprocess for shutter driving or preprocess for strobe lighting, other than IS processing is heavy in the MPU 101, digital filter calculation in one axial direction (pitch or yaw direction) is temporarily stopped, and the control signal to be output is interpolated, thereby preventing a deterioration in image quality due to driving of the correction lens 112 based on insufficient processing. For this purpose, the MPU 101 uses the temporal stop axis specifying switch 114, provided outside the MPU 101, to specify an axial direction in which the control signal to be output to drive the correction lens 112 is to be interpolated.

A sequence of correction of an image blur produced by hand vibrations will be described with reference to the flow charts of FIGS. 12 and 13A to 13C.

When the main sequence of the camera is started by, for example, turning on the main switch of the camera, the MPU 101 reads in various parameters from an EEPROM (not shown) in a series of operations in initialization processing and stores the parameters at predetermined addresses in a memory 102 in step #1301. The flow then advances to step #1302. If it is determined that a photographer has instructed the start of a series of operations of a vibration prevention system by turning on a switch SW1 upon pressing the release button to the first stroke (IS operation is started but blur correction has not been performed yet), the flow advances to step #1303 to initialize the variables to be used in the processing.

In step #1304, the MPU 101 initiates a timer for obtaining the timing of sampling. This timer generates an interrupt at predetermined intervals. The intervals are determined in accordance with the hand vibration correction ability and are generally set to about 500 $\mu$sec to 1 msec.

Every time the timer generates an interrupt, the MPU 101 alternately reads in the outputs from vibration gyros 106 and 107, which detect vibrations in the pitch and yaw directions, through the A/D conversion input terminals. First of all, in step #1305, the MPU 101 performs the following processing.

The MPU 101 reads in the output from the vibration gyro 106, which detects vibrations in the pitch direction, through an amplifier 108 and the A/D conversion input terminal. This hand vibration signal exhibits the median value in the A/D conversion input range when the angular velocity of a hand vibration is zero; an output larger than the median value when the angular velocity of a hand vibration is positive; and an output smaller than the median value when the angular velocity of a hand vibration is negative. The MPU 101 therefore subtracts a median value Vo in the A/D conversion input range from each output value Vin read in from the A/D conversion input terminal to obtain a value Vp, and controls the correction lens 112 by using the value obtained by integrating the values Vp.

The MPU 101 performs digital filtering by using the value Vp. In this case, the MPU 101 concurrently performs integration and high-pass filtering before the integration. High-pass filtering is performed to prevent slight offset components superimposed on the value Vp from being integrated so as to prevent the integrated value from overflowing. The design of the digital filter to be used changes depending on the hand vibration correction precision required and the like based on the frequency band of hand vibrations to be corrected and the performance of the camera. In this case, two pairs of high-pass filters and integrators respectively having poles of 1 Hz and 0.2 Hz are designed. During control, these pairs are switched from the one having a pole of 1 Hz to the one having a pole of 0.2 Hz. This can eliminate any phase error during control and stabilize the filter output at an early stage. This switching of frequencies as poles is termed as "time constant switching".

In practice, the MPU 101 sequentially obtains outputs according to the following equation:

$$Yp_n = a1 \times (Xp_{n-2} - Xp_n) + a2 \times Yp_{n-1} + a3 \times Yp_{n-2}$$

Parameters a1, a2, and a3 in the above equation are changed in time constant switching. This switching operation is performed about one sec after the start of integration. The value $Xp_n$ is a filter input value at an nth sampling point n in the pitch direction, i.e., the value Vp. The values $Xp_n$ and $Yp_n$ are filter input and output values at the nth sampling point n in the pitch direction. The values $Xp_{n-1}$ and $Yp_{n-1}$ are filter input and output values at an (n−1)th sampling point n−1 in the pitch direction. The values $Xp_{n-2}$ and $Yp_{n-2}$ are filter input and output values at an (n−2)th sampling point n−2 in the pitch direction.

Assume that the values $Xp_{n-2}$, $Yp_{n-1}$, and $Yp_{n-2}$ are zero at the first sampling (n=0). Likewise, the values $Xp_{n-2}$ and $Yp_{n-2}$ are zero at the second sampling (n=1).

The MPU 101 then obtains the driving position of the correction lens 112 from the value $Yp_n$. This embodiment uses a driving device using the moving magnet (MM) to move the correction lens 112 to a position proportional to the current supplied to the coil.

The MPU 101 obtains the current value to be supplied to the coil from the value $Yp_n$. In this case, the current to be supplied to the coil is not supplied as an analog quantity but as a digital quantity having undergone PWM (Pulse Width Modulation). This is because, for example, it is advantageous in terms of cost to control a current as a digital quantity by using the MPU 101. For this reason, a table for obtaining a PWM duty from the value $Yp_n$ is prepared, and the MPU 101 obtains the address in the memory at which the corresponding PWM duty is stored from the value $Yp_n$ and reads in the corresponding value, thereby setting a PWM duty. Note that this table is preferably set in the EEPROM.

When a PWM cycle and PWM duty is obtained in this manner, the MPU 101 sets this value in a predetermined register. With this operation, a PWM driving signal is supplied to a correction lens driving device 110. Upon reception of the driving signal, the correction lens driving device 110 supplies a current proportional to the supplied signal to the coil to drive the correction lens 112 to a predetermined position in the pitch direction (vertical direction). That is, the correction lens 112 is held at the predetermined position in accordance with the supplied driving signal until the next driving signal is supplied.

When the timer generates the next interrupt, the flow advances to step #1306 to detect vibrations in the yaw direction. The MPU 101 then performs the following processing.

The MPU 101 reads in the output from the vibration gyro 107 through an amplifier 109 and the A/D conversion input terminal. The MPU 101 obtains a value Vy by subtracting the median value Vo in the A/D conversion input range from the output value Vin read in through the A/D conversion input terminal, and controls the correction lens 12 by using the value Vy.

The MPU 101 performs digital filtering by using the value Vy. In this case, the MPU 101 concurrently performs integration and high-pass filtering before the integration. At this time, two pairs of high-pass filters and integrators respectively having poles of 1 Hz and 0.2 Hz are designed. During control, these pairs are switched from the one having a pole of 1 Hz to the one having a pole of 0.2 Hz. This switching of frequencies as poles is termed as time constant switching, as described above.

In practice, the MPU 101 sequentially obtains outputs according to the following equation:

$$Yy_n = a1 \times (Xy_{n-2} - Xy_n) + a2 \times Yy_{n-1} + a3 \times Yy_{n-2}$$

Parameters a1, a2, and a3 in the above equation are changed in time constant switching. This switching operation is performed about one sec after the start of integration. The value $Xy_n$ is a filter input value at the nth sampling point n in the yaw direction, i.e., the value Vy. The $Yy_n$ is a filter output value at the nth sampling point n in the yaw direction. The values $Xy_{n-1}$ and $Yy_{n-1}$ are input and output values at the (n−1)th sampling point n−1 in the yaw direction. The values $Xy_{n-2}$ and $Yy_{n-2}$ are input and output values at the (n−2)th sampling point n−1 in the yaw direction.

Assume that the values $Xy_{n-2}$, $Yy_{n-1}$, and $Yy_{n-2}$ are zero at the first sampling (n=0). Likewise, the values $Xy_{n-2}$ and $Yy_{n-2}$ are zero at the second sampling (n=1).

The MPU 101 obtains the driving position of the correction lens 112 from the value $Yy_n$. This embodiment uses the driving device using the moving magnet (MM) to move the correction lens 112 to a position proportional to the current supplied to the coil.

The MPU 101 obtains the current value to be supplied to the coil from the value $Yy_n$. In this case, the current to be supplied to the coil is not supplied as an analog quantity but as a digital quantity having undergone PWM (Pulse Width Modulation). For this reason, a table for obtaining a PWM duty from the value $Yy_n$ is prepared, and the MPU 1 obtains the address in the memory at which the corresponding PWM duty is stored from the value $Yy_n$ and reads in the corresponding value, thereby setting a PWM duty. Note that this table is preferably set in an EEPROM.

When a PWM cycle and PWM duty is obtained in this manner, the MPU 101 sets this value in a predetermined register. With this operation, a PWM driving signal is supplied to the correction lens driving device 111. Upon reception of the driving signal, the correction lens driving device 111 supplies a current proportional to the supplied signal to the coil to drive the correction lens 112 to a predetermined position in the yaw direction (horizontal direction). That is, the correction lens 112 is held at the predetermined position in accordance with the supplied driving signal until the next driving signal is supplied.

When driving of the correction lens 112 is started in this manner, the flow advances to step #1307 to perform IS processing for stabilizing the driving of the correction lens 112 for a predetermined period of time. More specifically, as described above, the MPU 101 alternately reads in the outputs from the vibration gyros 106 and 107 in the pitch and yaw directions through the A/D conversion input terminals every time the timer generates an interrupt. The MPU 101 then performs digital filter calculation and obtains the current (PWM duty) to be supplied to the coil from the calculation result so as to supply the desired driving position of the correction lens 112. The MPU 101 drives the correction lens 112 by setting this value in a predetermined register. The operation in steps #1305 to #1307 will be referred to as IS processing.

If it is determined in step #1308 that the photographer has generated a photographing request (e.g., a shutter driving request) by turning on a switch SW2 upon pressing the release button to the second stroke during IS processing, the MPU 101 performs the processing in step #1309 and the subsequent steps, e.g., starting shutter open operation, after a lapse of a predetermined wait time. Obviously, if it is determined that a photographing request (e.g., a shutter driving request) is generated after a lapse of a wait time, the flow immediately advances to the step of starting shutter open operation or the like.

If no photographing request is generated, the flow returns to steps #1305 to #1307 to perform IS processing again.

In starting shutter open operation or the like, the MPU 101 drives the focus adjusting lens to adjust the focus in step #1309. The MPU 101 then starts driving the shutter on the basis of the photometry result obtained in advance. That is, the MPU 101 initiates the timer to start shutter close operation and processing associated with strobe lighting upon generation of interrupts by the timer.

More specifically, if the MPU 101 determines on the basis of the photometry result that strobe lighting is required, the MPU 101 initiates two timers. Otherwise, the MPU 101 initiates one timer. In practice, when shutter open operation is started (step #1310) and the timer is initiated (step #1311), the flow advances to the step of performing IS processing (step #1312).

During shutter open operation, the MPU 101 alternately reads in the outputs from the vibration gyros 106 and 107 in the pitch and yaw directions through the A/D conversion input terminals every time a timer interrupt is generated as described above, and obtains the current value (PWM duty) to be supplied to the coil. The MPU 101 then sets this value in a predetermined register to drive the correction lens 112. The MPU 101 continues this IS operation until the timer generates the next interrupt.

When the two timers are initiated, one of the timers generates an interrupt for strobe lighting. When this interrupt is generated, the flow shifts to the routine in FIG. 13A. The MPU 101 then performs interpolation processing in one axial direction according to steps #1351 and #1352 in FIG. 13A and steps #1371 and #1372 in FIG. 13C.

The MPU 101 temporarily stops driving the correction lens 112 only in one axial direction. The temporal stop axis specifying switch 114 specifies one of the pitch and yaw directions in which the driving of the correction lens is to be temporarily stopped.

Since an interrupt for interpolation processing is permitted in step #1351, an interrupt for interpolation is generated at predetermined intervals during a preprocess for strobe lighting. Every time this interrupt is generated, the MPU 101 obtains a new PWM duty from the timing produced by the interrupt and three PWM duties (corresponding to current values that set the driving position of the correction lens 112) immediately before the start of interpolation processing. More specifically, assuming that a PWM duty changes in quadric fashion during this interpolation interval, the MPU 101 obtains a PWM duty at the ith interrupt from the start of interpolation by using three PWM duties PWM(n−1), PWM(n−2), PWM(n−3) immediately before interpolation processing according to the following equation:

$$PWM(n+m)=a\times(n+m)^2+b\times(n+m)+c$$

for $a=PWM(n-3)-2\times PWM(n-2)+PWM(n-1)$ $b=PWM(n-2)-PWM(n-3)-a\times(2n-3)$ $c=PWM(n-3)-a\times(n\times3)^2-b\times(n-3)$ $m=i-1$ In this case, the time point at which interpolation starts (the time point at which the first interrupt for giving an interpolation timing is generated) is represented by t=n, the PWM duty at this time point is represented by PWM(n), and the PWM duty at the ith interrupt from the start of interpolation is represented by PWM(n+m). The obtained PWM duty (the value of PWM(n+m)) is set in a predetermined register to supply a current to the coil, thereby driving the correction lens.

The interrupt for the timing of this interpolation is set in advance, and only permission of the interrupt is performed in this case. When the normal state is restored from the interrupt for strobe lighting, the interrupt for obtaining the timing of this interpolation is inhibited.

The MPU temporarily stops digital filter calculation in one axial direction and interpolates the output for the following reason. When the correction lens is driven by performing digital filter calculation in two axial directions, the considerably heavy load of a preprocess for strobe lighting is imposed on the MPU, as described above. This may cause a delay in IS processing, resulting in a deterioration in image quality upon driving the correction lens instead of improving the image quality.

The flow then advances to step #1353 to perform a preprocess for strobe lighting. That is, the MPU 101 checks whether the shutter has opened by a predetermined amount. This predetermined amount is determined by the guide number of the strobe device 103 and the photometry result obtained in advance. The opening amount of the shutter is detected by a position sensor (not shown). The MPU 101 detects the opening position of the shutter with the position sensor (not shown). If the shutter has opened to a predetermined position, the flow advances to step #1354 to perform strobe lighting. Obviously, if no strobe lighting is required, this processing is not performed, and the timer for this operation is not initiated.

When the normal state is restored from this timer interrupt or strobe lighting, IS processing is performed again (step #1312) to drive the correction lens 112 in the pitch and yaw directions. That is, every time the timer generates an interrupt as described above, the MPU 101 alternately reads in the outputs from the vibration gyros 106 and 107 in the pitch and yaw directions through the A/D conversion input terminals, and performs digital filter calculation. The MPU 101 then obtains the current value (PWM duty) to be supplied to the coil from the calculation result so as to set the desired driving position of the correction lens 112. The MPU 101 sets this value in a predetermined register to drive the correction lens 112.

Figure 13A:
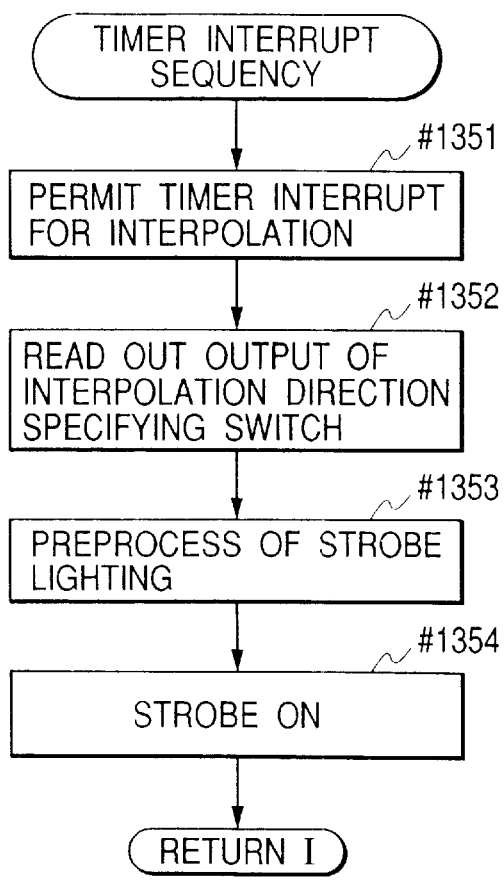
FIGS. 13A, 13B and 13C are flow charts showing another operation of the camera having the image blur correction function according to the fifth embodiment of the present invention.
Figure 13B:
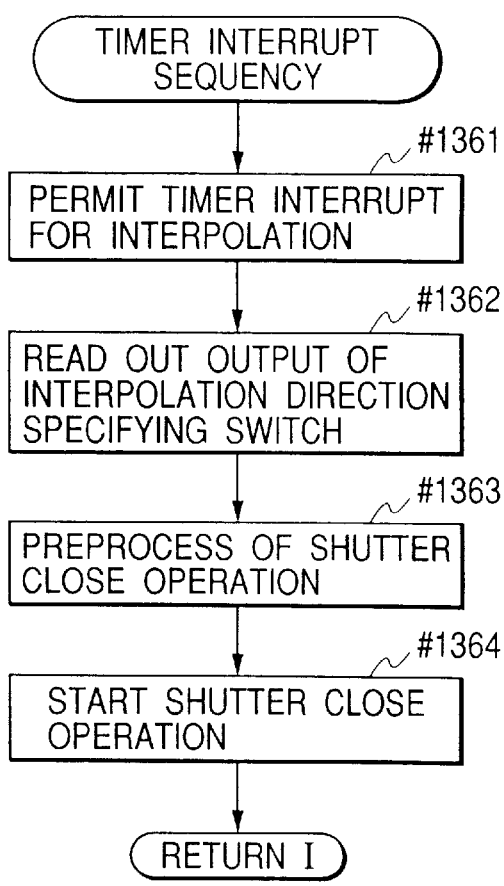
Figure 13C:
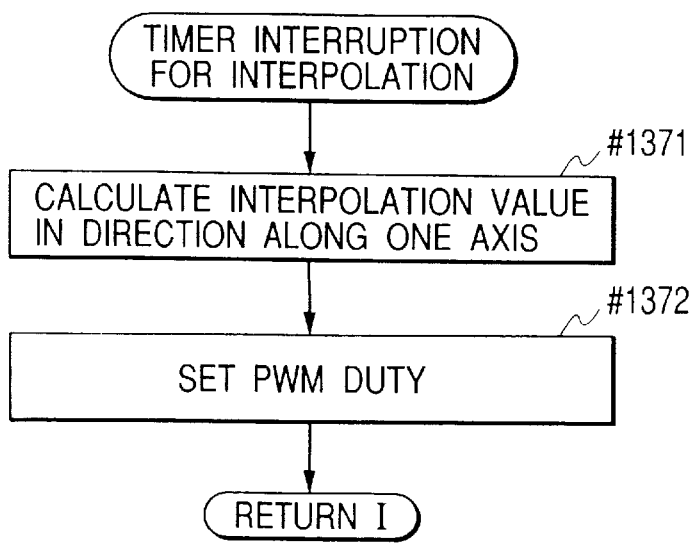

In addition, when a timer interrupt is generated to start shutter close operation, the flow advances to the routine in FIG. 13B to perform the same processing as described above. In steps #1361 and #1362, the MPU 101 reads in the setting in the temporal stop axis specifying switch 114, and performs interpolation processing in the designated direction (pitch or yaw direction). When an interrupt is generated, the MPU 101 also performs interpolation processing in steps #1371 and #1372 in FIG. 13C described above.

More specifically, the MPU 101 does not perform A/D conversion during this period, and obtains a new PWM duty from the timing produced by the interrupt and three PWM duties (corresponding to current values that set the driving position of the correction lens 112) immediately before the start of interpolation processing. More specifically, assuming that a PWM duty linearly changes during this interpolation interval, the MPU 101 obtains a PWM duty at the ith interrupt from the start of interpolation by using three PWM duties PWM(n−1), PWM(n−2), PWM(n−3) immediately before interpolation processing according to the following equation:

$$PWM(n+m)=a\times(n+m)^2+b\times(n+m)+c$$

for $a=PWM(n-3)-2\times PWM(n-2)+PWM(n-1)$ $b=PWM(n-2)-PWM(n-3)-a\times(2n-3)$ $c=PWM(n-3)-a\times(n-3)^2-b\times(n-3)$ $m=i-1$ In this case, the time point at which interpolation starts (the time point at which the first interrupt for giving an interpolation timing is generated) is represented by t=n, the PWM duty at this time point is represented by PWM(n), and the PWM duty at the ith interrupt form the start of interpolation is represented by PWM(n+m). The obtained PWM duty (the value of PWM(n+m)) is set in a predetermined register to supply a current to the coil to give the motor a desired rotational speed, thereby driving the correction lens.

The interrupt for the timing of this interpolation is set in advance, and only permission of the interrupt is performed in this case. When the normal state is restored from the interrupt for shutter close operation, the interrupt for obtaining the timing of this interpolation is inhibited.

The MPU temporarily stops digital filter calculation in one axial direction and interpolates the output for the following reason. When the correction lens is driven by performing digital filter calculation in two axial directions, the considerably heavy load of a preprocess for strobe lighting is imposed on the MPU, as described above. This may cause a delay in IS processing, resulting in a deterioration in image quality upon driving the correction lens instead of improving the image quality.

The flow then advances to step #1363 to perform a preprocess for shutter close operation. That is, the MPU 101 checks whether the shutter has opened by a predetermined amount. This predetermined amount is determined by the photometry result obtained in advance. The opening amount of the shutter is detected by a position sensor (not shown). That is, the MPU 101 detects the opening position of the shutter with the position sensor (not shown). If the shutter has opened to a predetermined position, the MPU 101 stops the shutter open operation, and starts shutter close operation in step #1364. If the MPU 101 determines on the basis of photometry value information or the like that a strobe device 103 should be turned on, the MPU 101 checks, before the above step of checking the opening amount of the shutter, whether the strobe device 103 has already been turned on. If the strobe device 103 has not been turned on, the MPU 101 turns it on at this time.

When the normal state is restored from this timer interrupt for the start of shutter close operation, IS processing is performed again (step #1312) to drive the correction lens 112 in the pitch and yaw directions. That is, every time the timer generates an interrupt as described above, the MPU 101 alternately reads in the outputs from the vibration gyros 106 and 107 in the pitch and yaw directions through the A/D conversion input terminals, and performs digital filter calculation. The MPU 101 then obtains the current value (PWM duty) to be supplied to the coil from the calculation result so as to set the desired driving position of the correction lens 112. The MPU 101 sets this value in a predetermined register to drive the correction lens 112.

The MPU 101 keeps performing IS processing (improving image quality by driving the correction lens) until the shutter is closed completely. The MPU 101 can detect the complete closed state of the shutter by using a switch that is turned on when the shutter is closed. If the MPU 101 detects in step #1313 in FIG. 12 that the shutter has been closed completely, the MPU 101 stops driving the correction lens 112. The flow then returns to step #1302.

According to the fifth embodiment described above, when the load of processing other than driving control (IS control) on the hand vibration correction lens is heavy in the MPU 101 which performs processing for closing the shutter in shutter driving operation and processing for the start of strobe lighting, an axis along which interpolation processing for driving control (IS control) on the correction lens is externally designated. During this operation, the MPU 101 calculates a control signal by interpolation calculation. This can prevent a deterioration in image quality due to insufficient image blur correction control.

In each embodiment described above, as heavy-load operations other than driving control (IS control) on the correction lens, shutter close driving operation and strobe lighting start operation have been exemplified. However, the present invention is not limited to them and can be applied to any processing as long as the processing load becomes heavy when the MPU concurrently performs the processing and driving control on the correction lens.

As the correction optical system, the system using the shift correction lens has been exemplified. However, an optical system using a variable apex angle prism may be used.

In each embodiment described above, the present invention is applied to the camera. However, the present invention can be applied to an optical device and other kinds of devices, other than cameras, which have an image blur correction function, devices applied to the optical devices or other kinds of devices, and elements constituting them.

As has been described above, according to the third to sixth embodiments of the present invention, there is provided a device having an image blur correction function which can prevent a deterioration in image quality due to insufficient hand vibration correction control instead of improving the image quality.

In addition, while the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Furthermore, the individual components shown in schematic or block form in the drawings are all well-known in the camera arts and their specific construction and operation are not critical to the operation or best mode for carrying out the invention.

According to the present invention, the above embodiments or their technical elements can be combined with each other, as needed.

The arrangements described in the claims or embodiments may form a single apparatus as a whole or separate apparatuses, may be combined with other apparatuses, or may be elements constituting an apparatus.

The present invention can also be applied to various cameras such as a single-lens reflex camera, lens-shutter camera, video camera, and the like, optical equipment or other devices other than the cameras, devices applied to such cameras, optical equipment, and other devices, and their constituting elements.

What is claimed is:

1. A control device for image blur correction, which is applied to an image blur correction device, comprising:
   calculation means for performing at least read-in operation of reading in an output from vibration detection means, performing first calculation by using the output, and generating a driving control signal for driving said image blur correction device, said calculation means also performing second calculation different from the first calculation; and restriction means for permitting read-in operation of the output from said vibration detection means but restricting the first calculation when said calculation means performs the second calculation.

2. A device according to claim 1, wherein said calculation means comprises means for performing calculation for focus adjustment as the second calculation.

3. A device according to claim 1, further comprising a memory for storing data corresponding to the output from said vibration detection means.

4. A device according to claim 3, wherein said memory comprises means for storing the data corresponding to the output from said vibration detection means which is read in when said calculation means performs the second calculation.

5. A device according to claim 4, wherein said calculation means comprises means for, when the second calculation is not performed, reading out data corresponding to the output from said vibration detection means from said memory and performing the first calculation using the readout data.

6. A device according to claim 1, wherein said calculation means comprises means for performing high-pass filter calculation as the first calculation.

7. A device according to claim 1, wherein said calculation means comprises means for performing integration calculation as the first calculation.

8. A device according to claim 1, wherein said calculation means comprises means for performing digital filter calculation as the first calculation.

9. A device according to claim 1, wherein said image blur correction control device performs PWM driving control on said image blur correction device.

10. A device according to claim 9, wherein said calculation means comprises means for performing digital filter calculation as the first calculation.

11. A device according to claim 1, wherein said image blur correction device performs image blur correction operation in a first direction and a second direction different from the first direction, and said calculation means comprises means for performing, as the first calculation, (1) calculation for generating a driving control signal for image blur correction in the first direction, and (2) calculation for generating a driving control signal for image blur correction in the second direction.

12. A device according to claim 11, wherein said restriction means comprises means for imposing the restriction on one of (1) the calculation for generating a driving control signal for image blur correction in the first direction and (2) the calculation for generating a driving control signal for image blur correction in the second direction, and imposing no restriction on the other.

13. A device according to claim 12, wherein said restriction means comprises means for determining one of directions of (1) the calculation for generating a driving control signal for image blur correction in the first direction and (2) the calculation for generating a driving control signal for image blur correction in the second direction, and to impose the restriction on a determined direction on the basis of a posture of a device to which said image blur correction device is applied.

14. A device according to claim 11, wherein said restriction means comprises means for determining at least one of (1) the calculation for generating a driving control signal for image blur correction in the first direction and (2) the calculation for generating a driving control signal for image blur correction in the second direction, and to impose the restriction on determined calculation on the basis of a posture of a device to which said image blur correction device is applied.

15. A device according to claim 1, wherein said calculation means comprises means for performing the first calculation in predetermined cycles.

16. A device according to claim 1, wherein said image blur correction device comprises means for optically correcting an image blur.

17. A device according to claim 1, wherein said image blur correction device comprises means for optically correcting an image blur by being displaced in an optical path.

18. An image blur correction apparatus comprising:

an image blur correction device;

calculation means for performing at least read-in operation of reading in an output from vibration detection means, performing first calculation by using the output, and generating a driving control signal for driving said image blur correction device, said calculation means also performing second calculation different from the first calculation; and restriction means for permitting read-in operation of the output from said vibration detection means but restricting the first calculation when said calculation means performs the second calculation.

19. An optical apparatus comprising:

an image blur correction device;

calculation means for performing at least read-in operation of reading in an output from vibration detection means, performing first calculation by using the output, and generating a driving control signal for driving said image blur correction device, said calculation means also performing second calculation different from the first calculation; and restriction means for permitting read-in operation of the output from said vibration detection means but restricting the first calculation when said calculation means performs the second calculation.

20. A camera comprising:

an image blur correction device;

calculation means for performing at least read-in operation of reading in an output from vibration detection means, performing first calculation by using the output, and generating a driving control signal for driving said image blur correction device, said calculation means also performing second calculation different from the first calculation; and restriction means for permitting read-in operation of the output from said vibration detection means but restricting the first calculation when said calculation means performs the second calculation.

* * * * *

UNITED STATES PATENT AND TRADEMARK OFFICE
CERTIFICATE OF CORRECTION

PATENT NO.    : 6,229,960 B1
DATED         : May 8, 2001
INVENTOR(S)   : Kazuki Konishi It is certified that error appears in the above-identified patent and that said Letters Patent is hereby corrected as shown below:

Column 3,
Line 11, "-the" should read -- the --.
Line 58, "form" should read -- from --.

Column 5,
Line 61, "Yy," should read -- $Yy_n$ --.

Column 6,
Line 30, "interrupt-ion" should read -- interruption --.

Signed and Sealed this

Second Day of April, 2002

Attest:

Attesting Officer

JAMES E. ROGAN
Director of the United States Patent and Trademark Office